(12) United States Patent
Honda et al.

(10) Patent No.: US 7,359,186 B2
(45) Date of Patent: Apr. 15, 2008

(54) STORAGE SUBSYSTEM

(75) Inventors: Kiyoshi Honda, Yokohama (JP); Shuji Sugimoto, Ninomiya (JP); Masahiko Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 10/967,361

(22) Filed: Oct. 19, 2004

(65) Prior Publication Data
US 2006/0048001 A1 Mar. 2, 2006

(30) Foreign Application Priority Data
Aug. 31, 2004 (JP) ............................ 2004-251940

(51) Int. Cl.
*H05K 7/20* (2006.01)
*H05K 5/00* (2006.01)
*H05K 7/16* (2006.01)

(52) U.S. Cl. .................. 361/685; 361/688; 361/724; 361/725; 361/727

(58) Field of Classification Search ............ 710/15–19; 361/679, 683–686, 724–727
See application file for complete search history.

(56) References Cited

U.S. PATENT DOCUMENTS

| | | | | |
|---|---|---|---|---|
| 5,655,150 A | * | 8/1997 | Matsumoto et al. | ......... 710/17 |
| 5,835,700 A | * | 11/1998 | Carbonneau et al. | ......... 714/44 |
| 5,966,510 A | * | 10/1999 | Carbonneau et al. | ......... 714/44 |
| 6,480,379 B1 | * | 11/2002 | Dickey et al. | ........... 361/687 |
| 6,906,918 B2 | * | 6/2005 | Rabinovitz | ............... 361/687 |
| 6,987,674 B2 | * | 1/2006 | El-Batal et al. | ........... 361/788 |
| 7,039,299 B2 | * | 5/2006 | Onodera | .................... 386/125 |
| 7,130,929 B2 | * | 10/2006 | Benhase et al. | ............. 710/10 |
| 7,200,008 B1 | * | 4/2007 | Bhugra | ..................... 361/724 |
| 7,254,749 B2 | * | 8/2007 | Abrahams et al. | ........... 714/47 |
| 2003/0049105 A1 | * | 3/2003 | Mueller et al. | ............. 414/277 |
| 2004/0036995 A1 | | 2/2004 | Suzuki et al. | |
| 2005/0185374 A1 | * | 8/2005 | Wendel et al. | ............. 361/685 |
| 2006/0041783 A1 | * | 2/2006 | Rabinovitz | .................... 714/6 |

FOREIGN PATENT DOCUMENTS

JP 2004-22058 6/2002

* cited by examiner

*Primary Examiner*—Lisa Lea-Edmonds
*Assistant Examiner*—Anthony M Haughton
(74) *Attorney, Agent, or Firm*—Reed Smith LLP; Stanley P. Fisher, Esq.; Juan Carlos A. Marquez, Esq.

(57) ABSTRACT

The storage subsystem is connected to an external device and comprises a storage device arrangement portion, on which a plurality of storage devices is arranged, and a control device that controls communications between the plurality of storage devices arranged on the storage device arrangement portion and the external device. The storage device arrangement portion is constituted such that the plurality of storage devices is arranged upright in the directions of two dimensions.

13 Claims, 21 Drawing Sheets

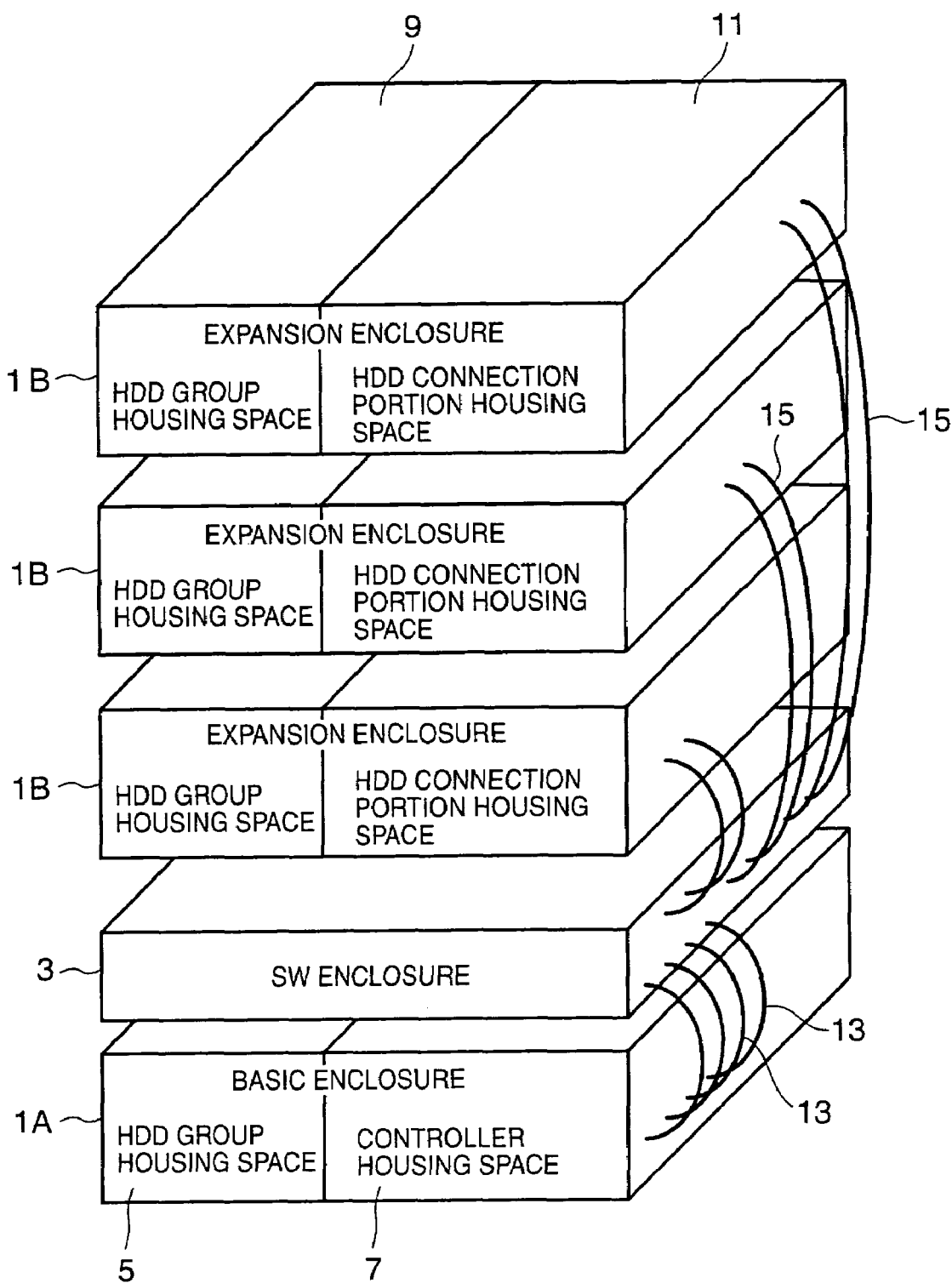

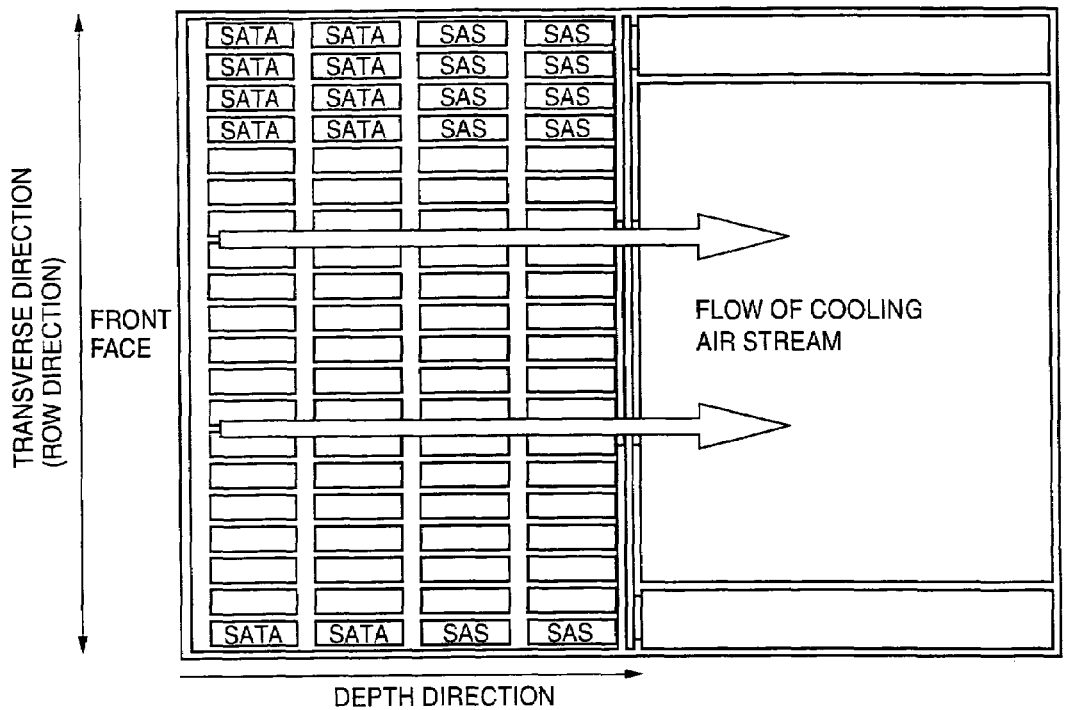
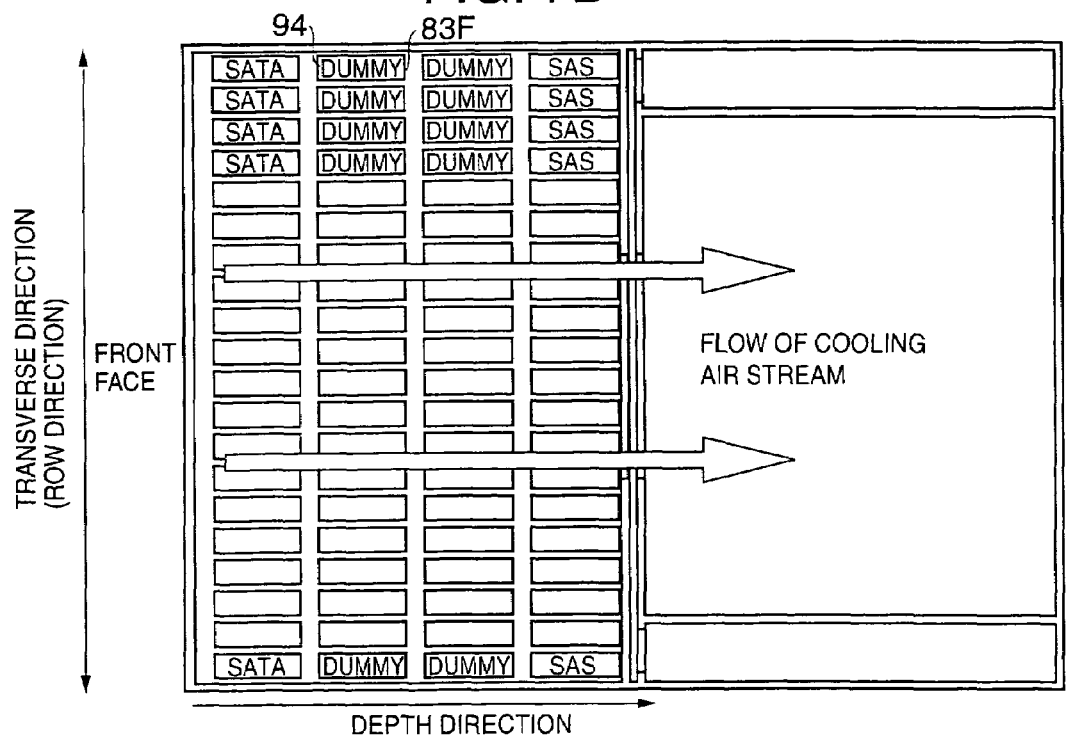

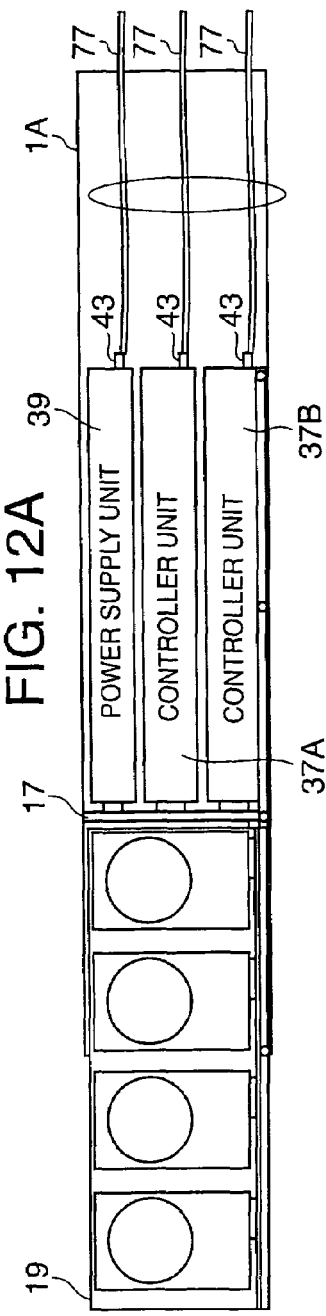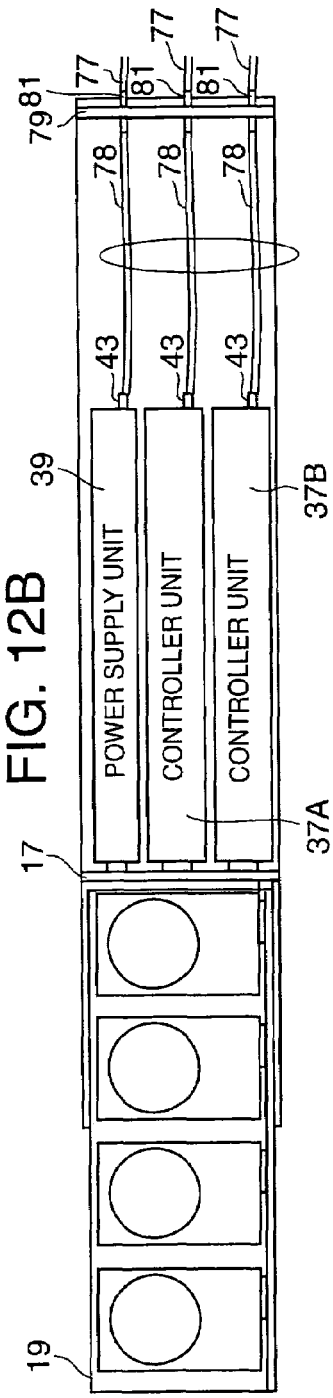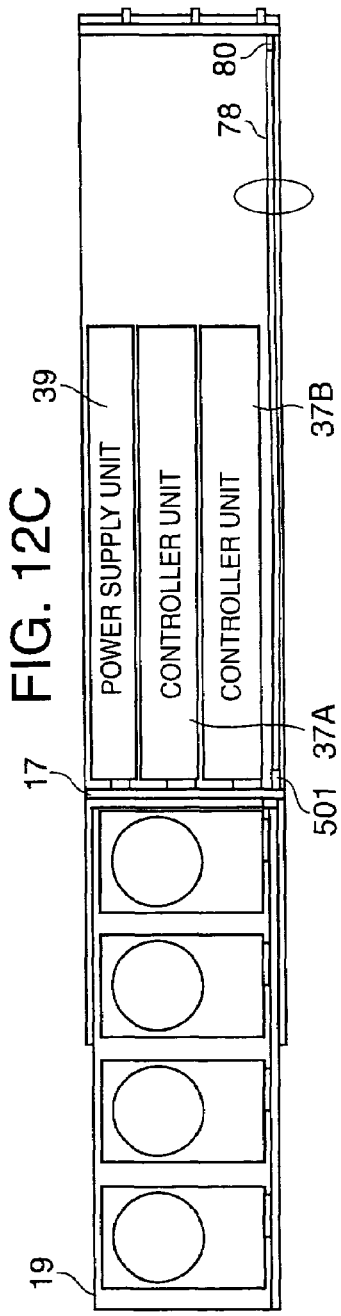

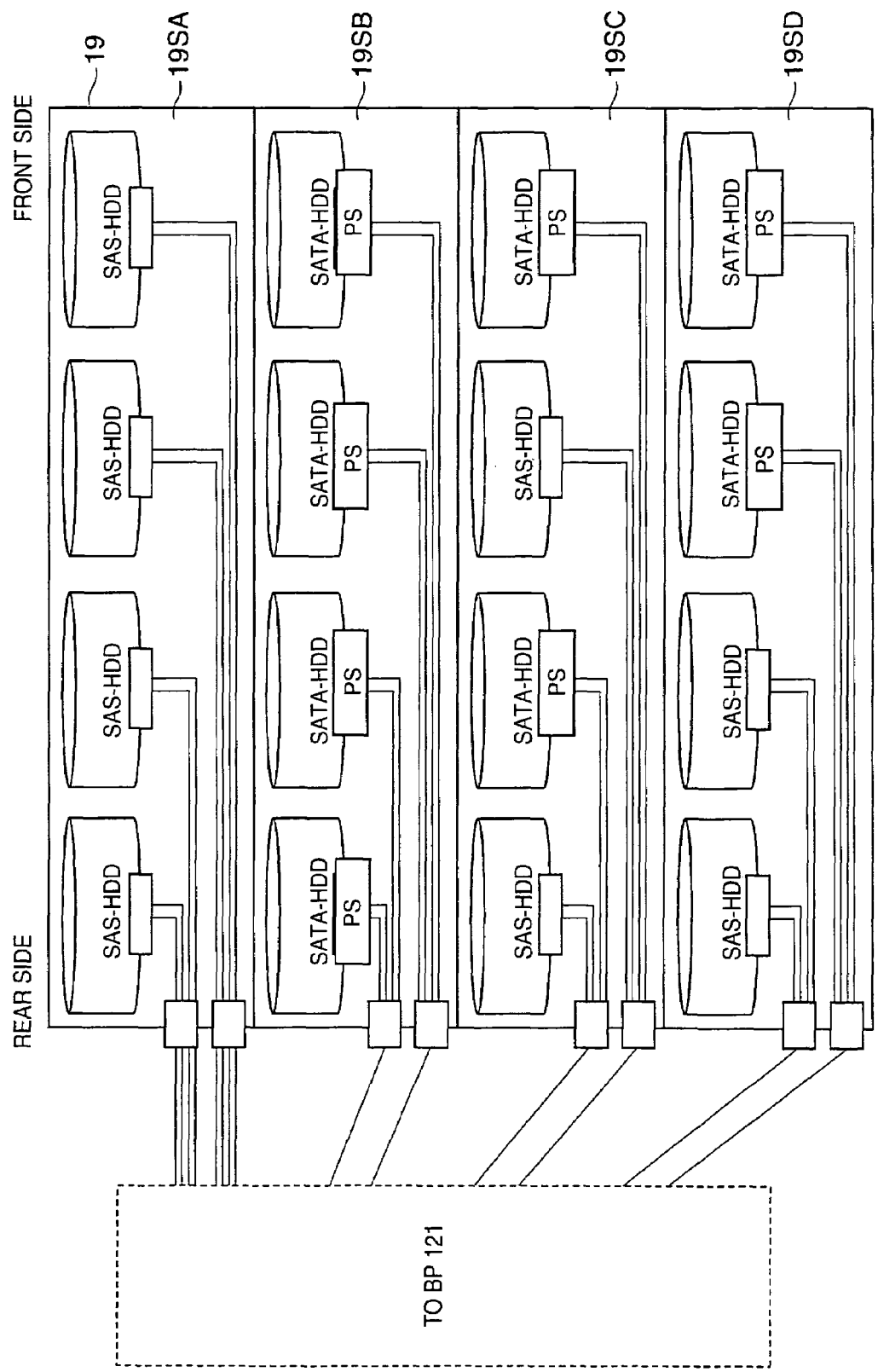

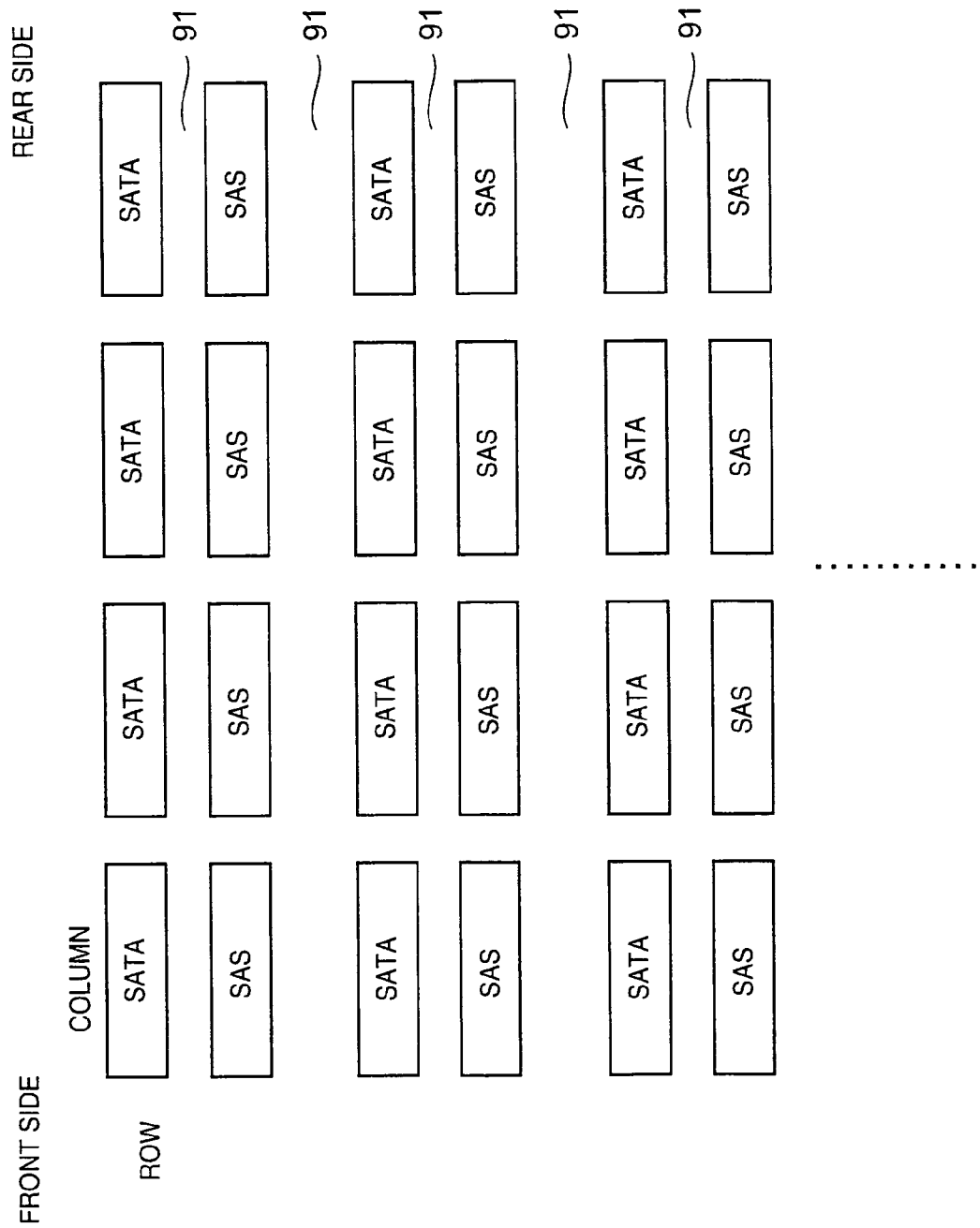

STORAGE SUBSYSTEM

CROSS-REFERENCE TO PRIOR APPLICATION

This application relates to and claims priority from Japanese Patent Application No. 2004-251940, filed on Aug. 31, 2004, the entire disclosure of which is incorporated herein by reference.

FIELD OF THE INVENTION

The present invention relates to a storage subsystem that comprises a plurality of storage devices.

BACKGROUND OF THE INVENTION

As a storage subsystem that comprises a plurality of storage devices, the storage subsystem disclosed by Japanese Patent Application Laid Open No. 2004-022058, for example, is known. This storage subsystem comprises a deep enclosure. Storage devices, which are inserted in the depth direction via the front side, are arranged in the enclosure. In other words, the user is able to install a storage device in the storage subsystem by inserting a storage device in the enclosure in the depth direction via the front side.

SUMMARY OF THE INVENTION

There is a desire for miniaturization of storage subsystems. Further, small-form factor hard disk drives (so-called 2.5-inch HDD developed for enterprises, for example) have been produced. A method that implements miniaturization of a storage subsystem by adopting such small-form factor hard disk drives (abbreviated to 'SFF-HDD' hereinafter) as the storage devices of the storage subsystem has been considered. However, simply changing the installed storage device to an SFF-HDD while retaining the conventional storage-device installation method is considered inadequate from at least one perspective among a variety of perspectives such as high-density mounting of the storage device, more efficient cooling of the storage subsystem and maintenance of the storage subsystem, for example.

Therefore, an object of the present invention is to provide a method of mounting storage devices that serves at least one of the miniaturization of the storage subsystem, an increased capacity, and a higher performance.

Another object of the present invention is to mount a plurality of storage devices in a storage subsystem of a high density.

A further object of the present invention is to raise the cooling efficiency of the storage subsystem.

Another object of the present invention is to simplify maintenance-related manipulation of the storage subsystem and to increase stability or reliability.

Further objects of the present invention will become evident from the following description.

A storage subsystem according to a first aspect of the present invention is connected to an external device (Host Computer, for example) and comprises a storage device arrangement portion on which a plurality of storage devices is arranged; and a control device that controls communications between the plurality of storage devices arranged on the storage device arrangement portion and the external device, wherein the storage device arrangement portion is constituted such that the plurality of storage devices is arranged upright in the directions of two dimensions. For example, the storage device arrangement portion comprises a substrate for the arrangement of storage devices and has a mounting portion (Connector, for example) for mounting the plurality of storage devices on the substrate.

Further, 'upright' storage devices means, for example, that the depth direction of the storage devices runs in the vertical direction. In other words, when the storage devices have a first face for which the depth direction is the normal direction and a second face, for example, a state where the first face is oriented vertically upward and the second face is oriented vertically downward is the upright state of the storage device. Further, in this case, a connector for connecting the storage device to a substrate or the like may be provided on the first face or the second face.

In a first embodiment, the storage subsystem further comprises a enclosure for housing the storage device arrangement portion; and an arrangement portion displacement mechanism that displaces the storage device arrangement portion inside and outside the enclosure. The arrangement portion displacement mechanism can displace the storage device arrangement portion in the directions of two dimensions (the depth direction of the enclosure and the reverse direction or the transverse direction of the enclosure, for example) for example.

In a second embodiment, the storage subsystem according to the first embodiment is such that the storage device arrangement portion comprises a first sub-arrangement portion for arranging two or more first storage devices among the plurality of storage devices; and a second sub-arrangement portion for arranging two or more second storage devices among the plurality of storage devices. The arrangement portion displacement mechanism displaces the first sub-arrangement portion and the second sub-arrangement portion separately.

In a third embodiment, the storage device arrangement portion comprises a plurality of storage device slots corresponding with a plurality of storage devices respectively and is constituted to arrange a plurality of storage devices, each of which is inserted via the plurality of storage device slots. Each of the plurality of storage device slots is constituted to receive a storage device in an upright state vertically from above.

In a fourth embodiment, the storage subsystem further comprises a cooling portion that causes a gas for cooling the storage devices arranged on the storage device arrangement portion to flow to the storage device arrangement portion. The storage device arrangement portion is constituted such that a plurality of storage device columns consisting of two or more storage devices that follow the direction in which the gas flows are formed and the plurality of storage device columns are at equal intervals.

In a fifth embodiment, the plurality of storage devices includes a low-heat storage device that emits heat by consuming first electrical power and a high-heat storage device that emits heat that is of a higher temperature than the heat of the low-heat storage device by consuming second electrical power. The storage subsystem further comprises a cooling portion that causes a gas for cooling the storage devices arranged on the storage device arrangement portion to flow to the storage device arrangement portion. The storage device arrangement portion is constituted such that the low-heat storage device is disposed upstream in the direction in which the gas flows and the high-heat storage device is disposed downstream in the direction in which the gas flows. Further, the first and second electrical power may be the same or different.

In a sixth embodiment, the storage subsystem further comprises a cooling portion that causes a gas for cooling the storage devices arranged on the storage device arrangement portion to flow to the storage device arrangement portion; and a storage device dummy that is disposed on the storage device arrangement portion so that the flow of gas is not disturbed when the maximum number of storage devices that can be arranged is not arranged on the storage device arrangement portion.

In a seventh embodiment, the storage subsystem further comprises a cooling portion that causes a gas for cooling the storage devices arranged on the storage device arrangement portion to flow to the storage device arrangement portion. The storage device arrangement portion is constituted such that a plurality of storage device columns consisting of two or more storage devices that follow the direction in which the gas flows are formed and the width of at least one storage device column among the plurality of storage device columns is narrower downstream than upstream in the direction in which the gas flows.

In an eighth embodiment, the storage device arrangement portion is constituted such that a plurality of storage device columns consisting of two or more storage devices are formed. The storage subsystem further comprises a plurality of operating portions corresponding with the plurality of storage device columns respectively, wherein the operation of an operating portion that is selected by a user from among the plurality of operating portions is detected and the user is allowed to remove a storage device that belongs to the storage device column corresponding with the selected operating portion.

In a ninth embodiment, the storage subsystem according to the eighth embodiment further comprises a enclosure for housing the storage device arrangement portion; and an arrangement portion displacement mechanism that displaces the storage device arrangement portion inside and outside the enclosure and in the directions of the two dimensions. The storage device column is a column formed in the same direction as the displacement direction of the storage device arrangement portion.

In a tenth embodiment, the storage device arrangement portion comprises a plurality of arrangement positions corresponding with the plurality of storage devices respectively. The control device comprises a storage region that stores control information indicating where in the plurality of arrangement positions which types of storage devices are arranged and indicating the respective states of each of the storage devices; and a control portion that displays a GUI screen. The control portion prepares a plurality of display positions on the GUI screen corresponding with the plurality of arrangement positions respectively, displays a graphic representing an arranged storage device in each of the plurality of display positions, and displays at least one of the type and state of the storage device corresponding with the graphic on the GUI screen so that the type and/or state is associated with the graphic.

The storage subsystem according to a second aspect of the present invention is a storage subsystem that is connected to an external device and that possesses depth, comprising a storage device arrangement portion on which a plurality of storage devices is arranged upright in the directions of two dimensions that include the depth direction of the storage subsystem; a control device that controls communications between the plurality of storage devices arranged on the storage device arrangement portion and the external device; a cooling portion that causes a gas for cooling the storage devices arranged on the storage device arrangement portion to flow to the storage device arrangement portion; a enclosure for housing the storage device arrangement portion, the control device and the cooling portion; and an arrangement portion displacement mechanism that displaces the storage device arrangement portion inside and outside the enclosure and in the directions of the two dimensions. The storage device arrangement portion is constituted such that a plurality of storage device columns consisting of two or more storage devices that follow the direction in which the gas flows are formed so that the plurality of storage device columns are at equal intervals or so that the width of at least one storage device column among the plurality of storage device columns is narrower downstream than upstream in the direction in which the gas flows. The storage subsystem further comprises a plurality of operating portions corresponding with the plurality of storage device columns respectively, wherein the operation of an operating portion that is selected by a user from among the plurality of operating portions is detected and the user is allowed to remove a storage device that belongs to the storage device column corresponding with the selected operating portion.

BRIEF DESCRIPTION OF THE DRAWINGS

FIG. 1 provides a schematic external view of a storage subsystem according to a first embodiment example of an embodiment of the present invention;

FIG. 7A shows an example of one variation on the cooling design;

FIG. 7B shows an example of another variation on the cooling design;

FIG. 12A shows a first variation on the integrated withdrawal method;

FIG. 12B shows a second variation on the integrated withdrawal method;

FIG. 12C shows a third variation on the integrated withdrawal method;

FIG. 19 shows the constitution of the HDD group installation drawer in the expansion enclosure 1B in detail; and FIG. 20 shows an example in which the columns constituted by the SATA-HDD 23A and the columns constituted by the SAS-HDD 23S are arranged alternately.

DETAILED DESCRIPTION OF THE PREFERRED EMBODIMENT

Figure 2A:
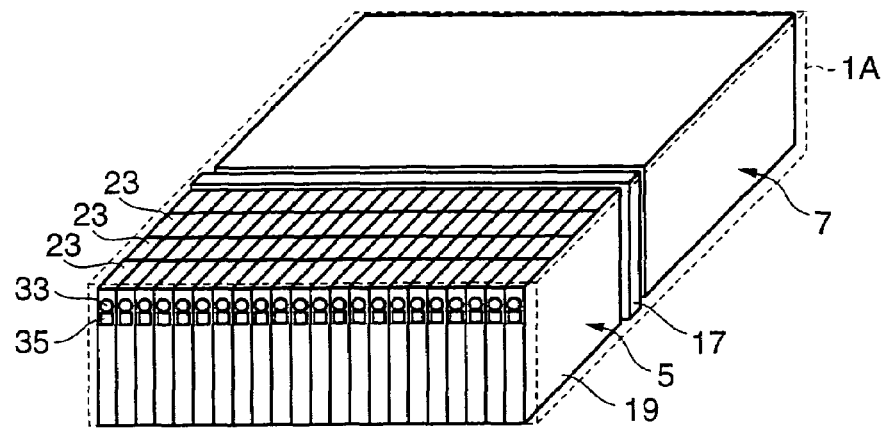
FIG. 2A shows a three-dimensional outline of the internal constitution of the basic enclosure 1A.

A storage subsystem relating to an embodiment of the present invention will be described hereinbelow with reference to the drawings. A variety of storage devices, such as hard disk drives (abbreviated to 'HDD' hereinafter), DVD (Digital Versatile Disks) drives or magnetic tape drives, for example, can be adopted as the storage devices that are installed in the storage subsystem. The storage devices are referred to as 'HDD' hereinbelow.

First Embodiment Example

FIG. 1 provides a schematic external view of a storage subsystem according to a first embodiment example of an embodiment of the present invention.

A storage subsystem 1 is a RAID (Redundant Array of Inexpensive Disks) system, for example. The storage subsystem 1 comprises a basic enclosure 1A, a plurality of (or a single) expansion enclosures 1B, 1B, . . . , and a switch enclosure (abbreviated to 'SW enclosure' hereinafter) 3 that electrically connects the basic enclosure 1A and expansion enclosures 1B.

The SW enclosure 3 comprises a switch device (not shown). An HDD connection portion (not shown) within the expansion enclosure 1B, which will be described subsequently, is connected to the switch device via a cable 15. Further, controller units (not shown) in the basic enclosure 1A (described subsequently) are connected to the switch device via cables 13. As a result, the controller units are able to access the HDDs in the expansion enclosure 1B via the switch device and the HDD connection portion within the expansion enclosure 1B.

The expansion enclosure 1B comprises, on the front side thereof, an HDD group housing space 9 for housing an HDD group comprising a plurality of HDD and comprises, on the rear side thereof, an HDD connection portion housing space 11 for housing an HDD connection portion. The HDD connection portion is connected to the switch device within the SW enclosure 3 via the cable 15.

The basic enclosure 1A comprises, on the front side thereof, an HDD group housing space 5 for housing an HDD group and comprises, on the rear side thereof, a controller housing space 7 for housing a controller unit, fan unit (not shown), and so forth of the storage subsystem 1. The controller unit is connected electrically to the HDD in the HDD group housing space 5 and is connected electrically to the switch device in the SW enclosure 3 via a cable 13. Accordingly, the controller unit is able to access the HDD in the HDD group housing space 5 and is able to access the HDD in the expansion enclosure 1B via the switch device in the SW enclosure 3 and the HDD connection portion within the expansion enclosure 1B.

Further, the SW enclosure 3 may be left out of the storage subsystem 1. In this case, the controller unit in the basic enclosure 1A may be connected to the HDD connection portion in the expansion enclosure 1B via a cable. Further, an HDD 23 may be of any size (a 3.5-inch HDD or 2.5-inch HDD is acceptable, for example).

Further, in the storage subsystem 1, the switch device (not shown) in the SW enclosure 3 may be installed in a enclosure 3 separate from the basic enclosure 1A or expansion enclosure 1B, as mentioned earlier, or may be installed in the basic enclosure 1A or expansion enclosure 1B. In the former case, the expansion capability is high and, in the latter case, miniaturization of the storage subsystem 1 is feasible because same is complete even if the SW enclosure 3 is not provided.

Figure 2B:
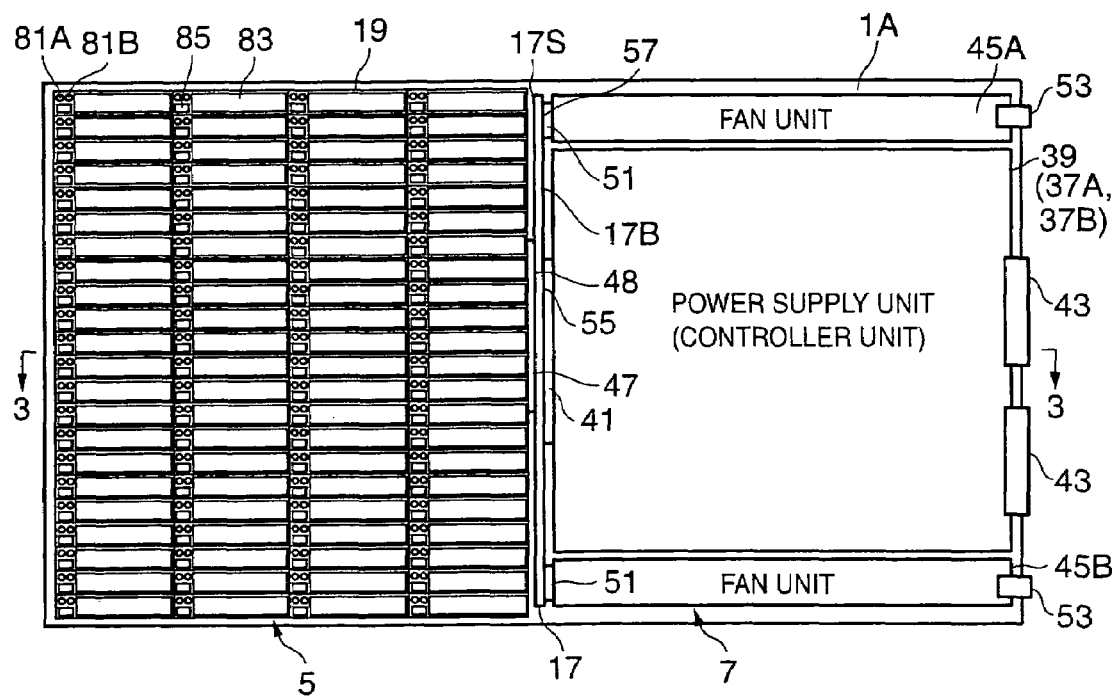
FIG. 2B is a block diagram that represents the internal constitution of the basic enclosure 1A when the basic enclosure 1A is viewed from above.
Figure 3:
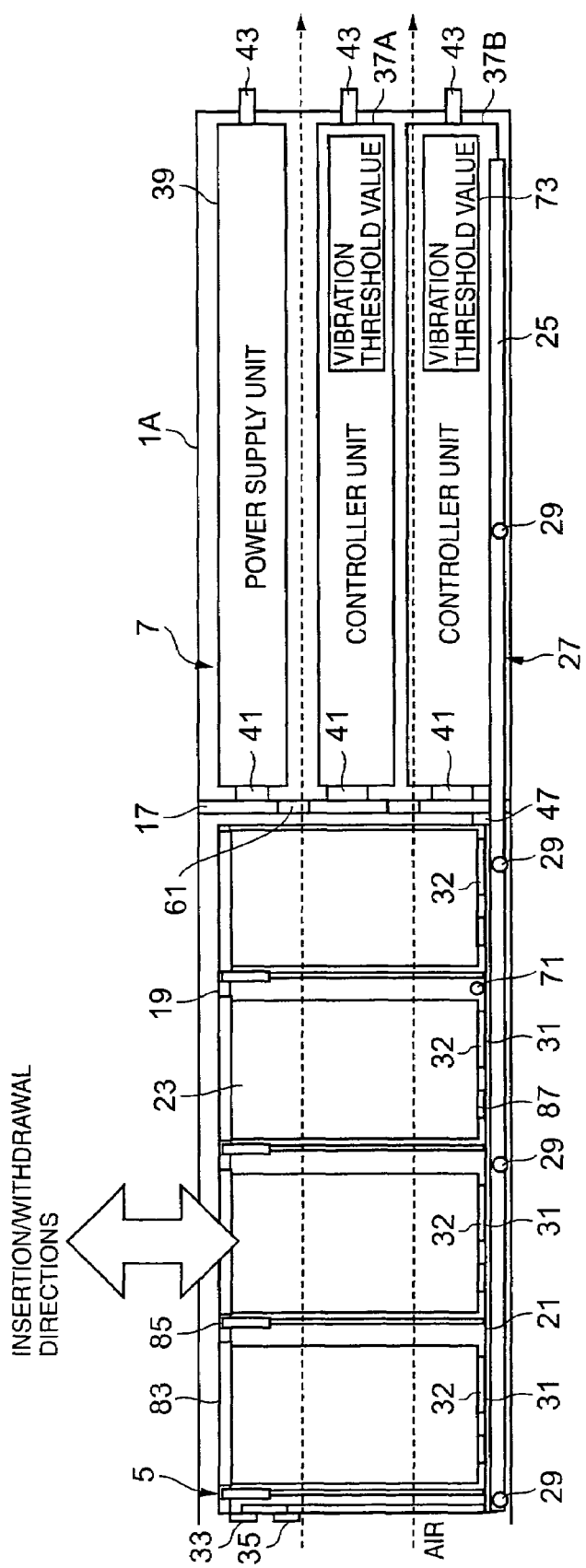
FIG. 3 provides a schematic view of the constitution of the cross-section 3-3 of the basic enclosure 1A in FIG. 2B.

FIG. 2A shows a three-dimensional outline of the internal constitution of the basic enclosure 1A. FIG. 2B is a block diagram that represents the internal constitution of the basic enclosure 1A when the basic enclosure 1A is viewed from above. FIG. 3 provides a schematic view of the constitution of the cross-section 3-3 of the basic enclosure 1A in FIG. 2B.

The basic enclosure 1A is a rectangular parallelepiped with an internal space and has depth from the front side toward the rear side. The internal space of the basic enclosure 1A is divided into the HDD group housing space 5 and the controller housing space 7. A back plane 17 is provided between the HDD group housing space 5 and the controller housing space 7 and the HDD group housing space 5 and controller housing space 7 are partitioned by the back plane 17.

An HDD group installation drawer 19 for installing an HDD group is provided within the HDD group housing space 5. A drawer slide mechanism 27 that enables the HDD group installation drawer 19 to slide in the depth direction and in the reverse direction (that is, in both directions toward the rear side and front side) is provided in the basic enclosure 1A. The drawer slide mechanism 27 may be any mechanism as long as same allows the HDD group installation drawer 19 to slide. As one example, the drawer slide mechanism 27 comprises a rail 25 on which the HDD group installation drawer 19 is placed, and a plurality of guide rollers 29 that guide the rail 25 in both directions toward the front and rear sides of the basic enclosure 1A, as shown in FIG. 3. The plurality of guide rollers 29 stand in a line in the depth direction. The provision of such a drawer slide mechanism 27 makes it possible to suppress vibrations of the HDD 23 and thus prevent problems such as system stoppage from occurring. Further, a stopper for limiting the distance over which the HDD group installation drawer 19 is withdrawn may be provided in the basic enclosure 1A. The front face of the basic enclosure 1A may be a door that can be opened and closed that may be open beforehand. As a result, the HDD group installation drawer 19 can be inserted and withdrawn.

The HDD group installation drawer 19 is a rectangular-parallelepiped-shaped box with depth, for example (any shape is permissible as long as the shape has depth). A plurality of HDD 23 is arranged in the HDD group installation drawer 19 in the directions of two dimensions. More specifically, two or more HDDs 23 are arranged from the front side toward the rear side (that is, in the depth direction) in the HDD group installation drawer 19, for example. Here, the depth direction of the HDD 23 is orthogonal to the depth direction of the basic enclosure 1A and is parallel to the height direction of the basic enclosure 1A. To state this another way, two or more HDDs 23 are arranged in a standing state in the depth direction of the basic enclosure 1A within the HDD group installation drawer 19. In other words, each HDD 23 is a rectangular parallelepiped the vertical dimension of which is the longest, the horizontal dimension of which is the second-longest, and the height of which is the third-longest. The respective HDDs 23 are arranged such that the vertical of the HDD 23 is parallel to the height of the basic enclosure 1A and the horizontal of the HDD 23 is parallel to the depth of the basic enclosure 1A. Accordingly, the HDD 23 can be provided at a high density within a fixed space. According to the present embodiment, two or more (four, for example) HDDs 23 are arranged in the depth direction in the HDD group installation drawer 19 and two or more (twenty-two, for example) HDDs 23 are arranged in the width direction, for example. Further, in this embodiment, the HDDs 23 may be arranged such that the width of the HDDs 23 follows the depth direction of the basic enclosure 1A, but may instead be arranged such that the height of the HDD 23 follows the depth direction of the basic enclosure 1A. Hereinbelow, an arrangement of two or more HDDs 23 in the depth direction of the basic enclosure 1A (that is, in the vertical width direction of the basic enclosure 1A is sometimes referred to as a 'column' or 'HDD column' and an arrangement of two or more HDDs 23 in the transverse width direction) is sometimes referred to as a 'row' or 'HDD row'. An HDD column may be parallel to the depth direction or inclined with respect to the depth direction. Likewise, an HDD row may be parallel to the transverse width direction or inclined with respect to the depth direction. Furthermore, the distance between an HDD column and an adjacent HDD column may be the same between all the columns or may be different. Likewise, the distance between an HDD row and an adjacent HDD row may be the same between all the rows or may be different.

An HDD group mounting substrate 21 is laid on the bottom of the HDD group installation drawer 19. The HDD group mounting substrate 21 is a printed substrate on which a wiring pattern has been printed, for example. A plurality of HDD mounting portions 31 (connectors that are embedded in the substrate 21, for example), to which connectors 32 of the HDD 23 (or connectors of canisters in which the HDD 23 are installed) are physically connected, are provided densely over the whole area of the HDD group mounting substrate 21. Stated using the example in FIGS. 2A, 2B, and 3, two or more (four, for example) HDD mounting portions 31 are arranged in the row direction (width direction) on the HDD group mounting substrate 21 and two or more (twenty-two, for example) HDD mounting portions 31 are arranged in the column direction (depth direction). Further, a plurality of HDDs 23 mounted in the HDD group installation drawer 19 may be constituted by only HDDs of one type (HDDs of the same standard, for example), or may be constituted by HDDs of a plurality of types. In this first embodiment example, two types are mixed, namely SATA (Serial ATA)-standard HDDs ('SATA-HDDs' hereinafter) and SAS (Serial Attached SCSI)—standard HDDs ('SAS-HDDs' hereinafter).

As shown in FIGS. 2B and 3, a plurality of HDD slots 83 arranged in the directions of two dimensions (in the row and column directions, for example) is provided on the upper face of the HDD group installation drawer 19. HDDs 23 are inserted in the HDD slots 83. The HDD 23 has a front face and rear face, the depth direction of the HDD 23 being the normal direction, and has a connector 32 on the rear face, for example. When the HDD 23 is completely inserted in the HDD 83 with the rear face of the HDD 23 oriented vertically downward, the connector 32, which is provided on the rear face of the HDD 23, is physically connected to the HDD mounting portion 31 in the HDD group mounting substrate 21. Further, a door, which is in a closed state when the HDD 23 is pressed into the opening of the HDD slot 83 to open same and there is no HDD 23 and/or when the HDD 23 is inserted completely, for example, may be provided. The provision of such a door makes it possible to prevent dust and so forth from entering via the HDD slot 83.

Figure 4A:
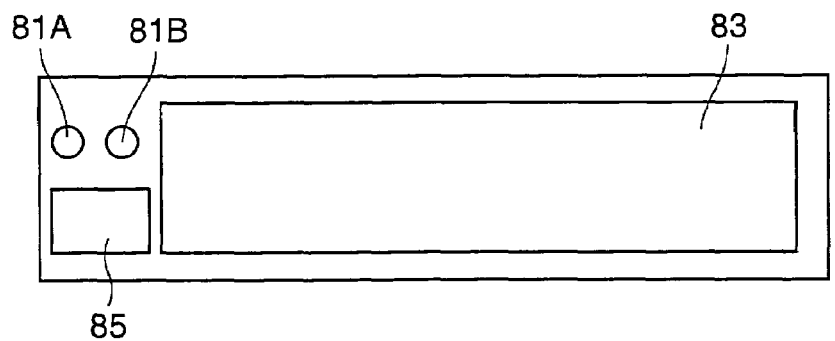
FIG. 4A provides an enlarged view of the HDD slot 83 in FIG. 2B and of the vicinity thereof.
Figure 4B:
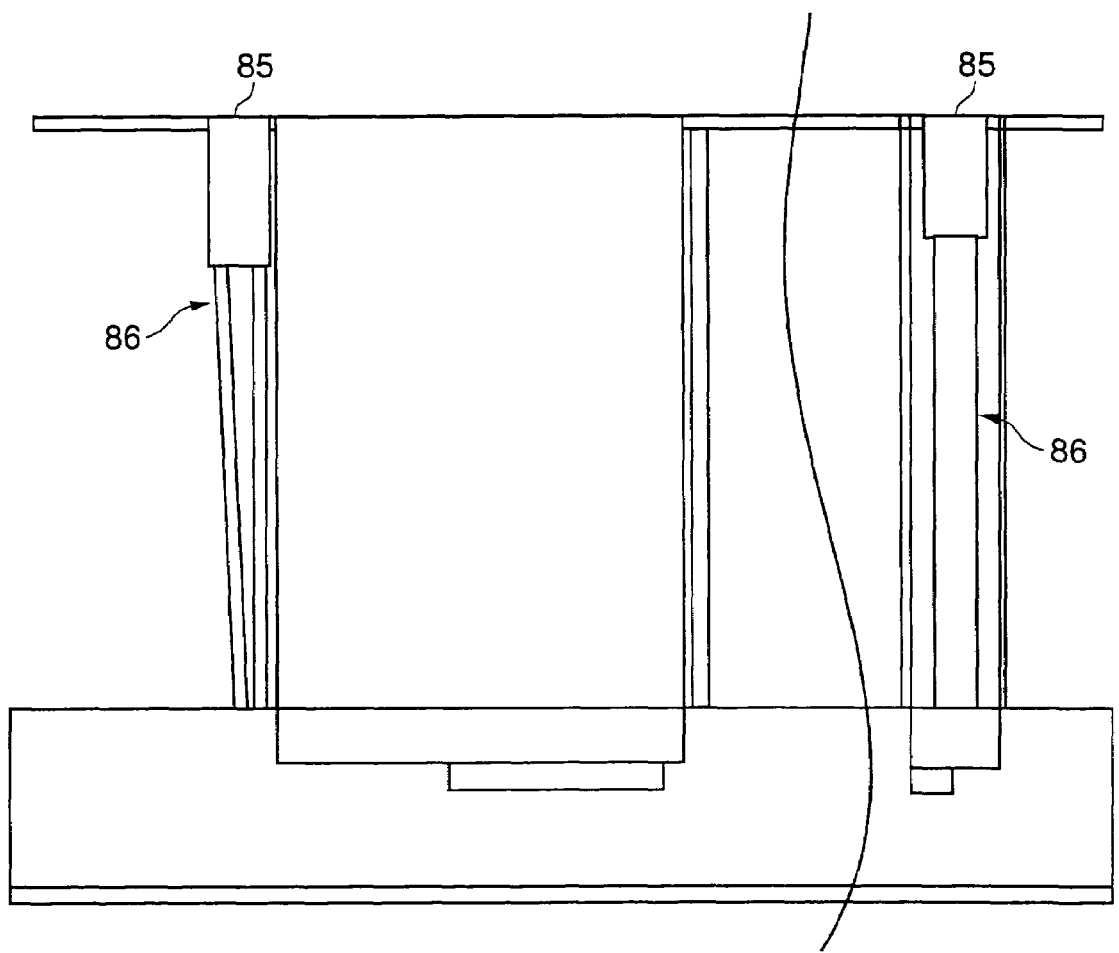
FIG. 4B provides a schematic of a cross section of an HDD 23 that has been inserted completely via the HDD slot 83.

One or more (two, for example) first state display lamps (LED, for example) 81A and 81B and an eject button 85 are provided close to each HDD slot 83 (near the front side of the opening of the HDD slot 83, for example) in the upper face of the HDD group installation drawer 19. FIG. 4A provides an enlarged view of the HDD slot 83 in FIG. 2B and of the vicinity thereof, while FIG. 4B provides a schematic of a cross section of an HDD 23 that has been inserted completely via the HDD slot 83. The left-hand figure in FIG. 4B shows an eject mechanism 86 and HDD 23 as viewed from the side of the basic enclosure 1A and the right-hand figure in FIG. 4B shows the eject mechanism 86 and HDD 23 as viewed from the front face of the basic enclosure 1A. Controller units 37A and 37B, which will be described subsequently, are able to ignite and turn off at least one of the first-state display lamps 81A and 81B that correspond with the HDD slot 83 comprising the HDD 23 in accordance with the state of a certain HDD 23 (access in progress, for example), for example. When the eject button 85 is operated, the HDD 23 in the HDD slot 83 corresponding with the eject button 85 is extracted via the HDD slot 83 by means of the eject mechanism 86. Further, the extraction of the HDD 23 may be performed by means of computer processing of the controller units 37A and 37B when a signal indicating that the eject button 85 has been pressed is sent to the controller units 37A and 37B, for example, or may be executed by means of a mechanical constitution not requiring computer processing. Further, removal of the HDD 23 is not limited to a method that adopts the eject mechanism 86. Several variations may be considered. These variations will be described in the third embodiment example (described subsequently).

As shown in FIG. 3, a lock mechanism 87 is provided for each HDD slot 83. The lock mechanism 87 is a mechanism that controls the insertion of the HDD 23 into the corresponding HDD slot 83 and/or the removal of the HDD 23 from the HDD slot 83. When the lock mechanism 87 has locked the HDD slot 83, removal of the HDD 23 via the HDD slot 83 is not possible and, when the lock is released, removal of the HDD 23 via the HDD slot 83 is permitted. A variety of methods can be adopted as the method of locking the HDD slot 83.

The HDD group installation drawer 19 has a second state display lamp 33 and a lock control button 35 provided for each column as shown in FIG. 2A. The second state display lamp (LED, for example) 33 and lock control button 35 are electrically connected to the controller unit 37A (and/or 37B) via the HDD group mounting substrate 21, for example. In a case where the occurrence of an anomaly is detected with at least one of the two or more HDDs 23 belonging to a certain column, the controller unit 37A ignites the second state display lamp 33 that corresponds with this column. Further, upon detecting that the lock control button 35 corresponding with a certain column has been operated, the controller unit 37A enables the mounting and/or removal of the HDD 23 belonging to the column and prohibits the mounting and/or removal of the HDD 23 belonging to each of the other columns. To describe this more specifically, upon detecting that the lock control button 35 corresponding with a certain column has been operated, the controller unit 37A controls each lock mechanism 87 corresponding with the HDD slots 83 belonging to the column to enable removal (or mounting) of the HDDs 23 belonging to the column and controls each lock mechanism 87 corresponding with the HDD slots 83 belonging to each of the other columns to prohibit removal (or mounting) of the HDDs 23 via the HDD slots 83 belonging to each of the other columns, for example. As a result, unless the lock control button 35 corresponding with the desired column is pressed, the HDDs 23 cannot be removed via the HDD slots 83 belonging to the column. Hence, the unintentional removal of HDDs 23 by mistake can be prevented.

A connector (referred to as a 'back plane front-face connector' hereinbelow) 47 that is connected to the front face of the back plane 17 is provided on the rear side of the HDD group installation drawer 19. The back plane front-face connector 47 is electrically connected to the HDD group mounting substrate 21 (may be physically connected).

In the middle area of the controller housing space 7, multiplexed (duplexed, for example) controller units 37A and 37B and a power supply unit 39, which constitutes a secondary power supply for the controller units 37A, 37B and the HDDs 23 in the basic enclosure 1A, is provided. The controller units 37A and 37B and the power supply unit 39 are arranged in a stacked configuration. For example, the power supply unit 39 is located in the upper layer and the controller units 37A and 37B are located in a layer below the battery 39. A connector is provided on the front and rear sides of each of the controller units 37A, 37B and power supply unit 39. A front-side connector 41 is physically connected (or electrically connected) to the rear side 17B of the back plane 17 and a rear-side connector 43 is physically or electrically connected to a variety of targets (communication network, back plane 17, the switch device in the SW enclosure 3 or mains power supply, for example). As a result, the power supply unit 39 can supply electrical power to each of the HDDs 23, each of the controller units 37A and 37B, and/or each of fans 45A, 45B (described subsequently) via the back plane 17. Further, one controller unit 37A (or 37B) is able to access the other controller unit 37B (or 37A) via the front-side connector 41 and back plane 17. Furthermore, the controllers 37A and 37B are able to access an optional HDD 23 via the rear-side connector 43 (or front-side connector 41), the back plane 17 and the HDD group mounting substrate 21 and are able to access an HDD in the expansion enclosure 1B via the SW enclosure 3. The controller units 37A and 37B are also able to receive a read command or write command from a host device via the rear-side connector 43 and then access an optional HDD 23 via the back plane 17 in response to this read command or write command. The controller units 37A and 37B may also execute specified fault processing when a maintenance/replacement mode is executed (when it is detected that the lock control button corresponding with a certain column has been pressed, for example). A specific example will be provided below. For example, a vibration sensor 71, which outputs a signal with a value corresponding to the vibration of the HDD group installation drawer 19 to the controller units 37A and 37B, is provided on the HDD group mounting substrate 21. The controller units 37A and 37B are provided with a vibration threshold value storage area 73 (provided in the memory of the controller circuit (mentioned subsequently) in the controller unit 37A, for example) for storing a threshold value for the signal value from the vibration sensor 71 ('vibration threshold value' hereinafter). The vibration threshold value is set at a value that is sufficiently higher than the signal value outputted in accordance with the vibration that occurs when the HDD group installation drawer 19 is withdrawn or inserted. The controller units 37A and 37B compare the value of the signal received from the vibration sensor 71 with the vibration threshold value that is stored in the vibration threshold value storage area 73. When the value of the received signal is lower than the vibration threshold value, the controller units 37A and 37B judge that the HDD group installation drawer 19 has been withdrawn or pushed in and the specified fault processing corresponding with this judgment result is executed. When the value of the received signal is higher than the vibration threshold value, the controller units 37A and 37B judge that an error has occurred and normal fault processing is executed. Where normal fault processing is concerned, the controller units 37A and 37B execute processing to move data in each HDD 23 to an HDD 23 in another enclosure (the expansion enclosure 1B, for example), for example. On the other hand, where specified fault processing is concerned, the controller units 37A and 37B access an optional HDD 23 in response to a write command or read command from a host device and, when this access fails, the controller units 37A and 37B execute a higher number of retries than the normal number (that is, the number of times a retry is executed is then greater than the normal number).

Fan units 45A and 45B are provided to the left and right of the middle area of the controller housing space 7. The fan units 45A and 45B are duplexed fan units. The fan units 45A and 45B comprise a connector on both the front and rear sides. A front-side connector 51 is connected physically or electrically to the rear face 17B of the back plane 17. As a result, the fan units 45A and 45B can be driven as a result of receiving a supply of electrical power via a rear-side connector 53 and this driving allows air to be introduced from the front face of the basic enclosure 1A via the HDD group installation drawer 19, for example. As a result, the interior of the HDD group installation drawer 19 is cooled.

The back plane 17 is a printed substrate printed with a wiring pattern that has a front face 17S and a rear face 17B. A connector 48 to which the connector 47 of the HDD group installation drawer 19 is physically or electrically connected is provided on the front face 17S of the back plane 17. A connector 55, to which the connectors 41 of the power supply unit 39 and controller units 37A and 37B are physically or electrically connected, and a connector 57, to which the connectors 51 of the fan units 45A and 45B are physically or electrically connected, are provided on the rear face 17B of the back plane 17. The connectors 48, 55, and 57, which are provided on the back plane 17, are embedded in the back plane 17, for example. Because the HDD group installation drawer 19, in which the HDDs 23 are mounted, the controller units 37A and 37B, and so forth, are connected to the back plane 17, the controller units 37A and 37B are able to access an optional HDD 23 via the back plane 17 and HDD group mounting substrate 21. Further, as will be described subsequently, the back plane 17 has a hole 61 for transmitting air, which has been introduced from the front face of the basic enclosure 1A and that has passed within the HDD group installation drawer 19, to the rear side. As shown in FIG. 3, the insertion and extraction direction of the HDD 23 in the HDD group installation drawer 19 is a direction that transects (is orthogonal to, for example) the direction of air flow (indicated by the dotted line). The HDD mounting portions 31 are arranged in the direction of air flow and not opposing the direction of air flow. As a result, it is possible to prevent dust from falling onto the HDD group mounting substrate 21 and hence the occurrence of contact problems between the HDD group mounting substrate 21 and HDD 23, and so forth.

An outline of the constitution and functions of the basic enclosure 1A was provided above. The constitution in the HDD group housing space 5 can also be applied to the HDD group housing space 9 of the expansion enclosure 1B.

Furthermore, a description will be provided below for the installation and removal of the HDD 23 in and from the HDD group installation drawer 19 when the HDD group installation drawer 19 of the basic enclosure 1A is withdrawn or pushed in.

Figure 5A:
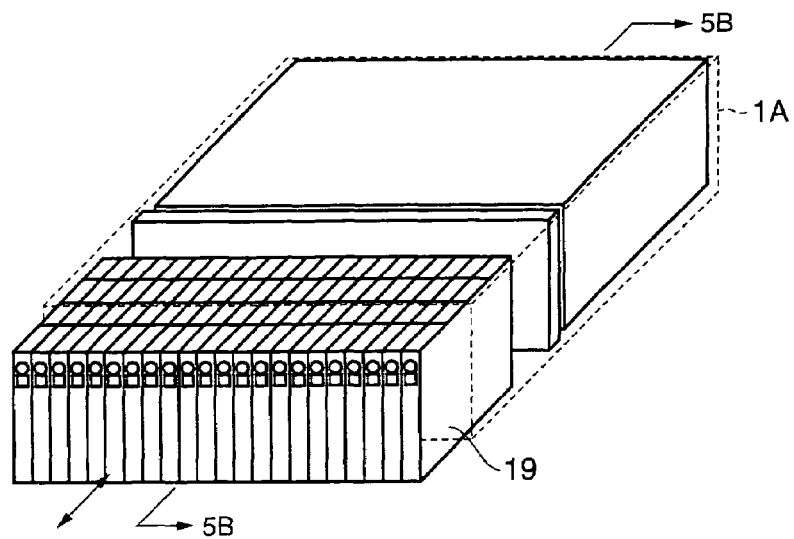
FIG. 5A schematically shows an external view in a case where the HDD group installation drawer 19 is withdrawn to a certain extent from the basic enclosure 1A.
Figure 5B:
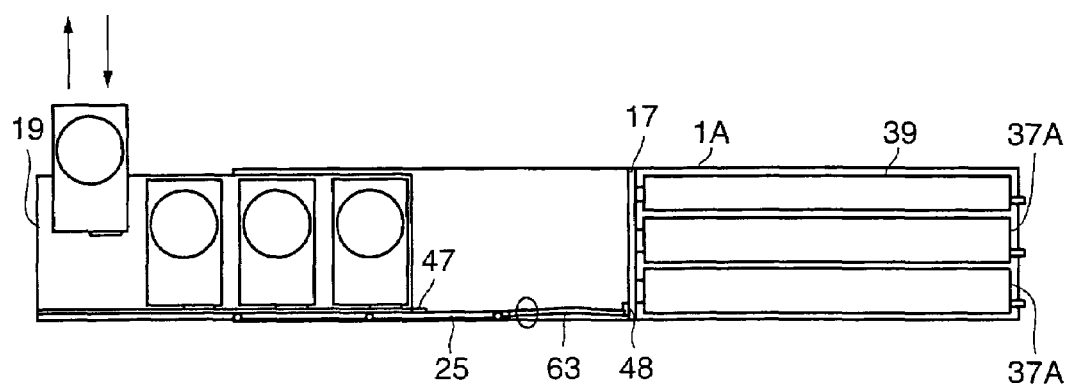
FIG. 5B schematically shows the cross section 5B-5B in FIG. 5A.

FIG. 5A schematically shows an external view in a case where the HDD group installation drawer 19 is withdrawn to a certain extent from the basic enclosure 1A. FIG. 5B schematically shows the cross section 5B-5B in FIG. 5A. Further, the cross-sectional view shown in FIG. 5B is a more schematic view than that of FIG. 3.

The HDD group installation drawer 19 can be withdrawn smoothly toward the front side (in a direction that is the reverse of the depth direction of the basic enclosure 1A) and can be pushed in the depth direction by means of the drawer slide mechanism 27 mentioned earlier. In a case where an optional HDD 23 is mounted, the user withdraws the HDD group installation drawer 19 and inserts the HDD 23 downward vertically from above into an optional HDD slot 83 among a plurality of HDD slots 83. The user also withdraws the HDD group installation drawer 19 and removes the HDD 23 in the optional HDD slot 83 upward vertically from below when an optional HDD 23 is removed from the basic enclosure 1A. Such installation or removal of the HDD 23 can be performed even when the power supply of the controller units 37A, 37B, HDD 23, and so forth is ON. That is, hot swapping of the HDD 23 is possible.

As shown in FIGS. 5A and 5B, the HDD group installation drawer 19 is withdrawn separately from the back plane 17. In other words, the rear side parts (the back plane 17 and the parts that are further in the depth direction than the back plane 17) are fixed. Only the HDD group installation drawer 19 slides. A cable 63, which provides an electrical connection between the connector 47 of the HDD group installation drawer 19 and the front-side connector 48 of the back plane 17, is provided. The cable 63 is a flexible-film-like cable, for example. As a result, in a state where the HDD group installation drawer 19 is completely housed in the basic enclosure 1A, for example, the cable 63 is housed in the space between the HDD group installation drawer 19 and the bottom of the basic enclosure 1A (a space with the height of the rail 25, for example). Further, it is considered advantageous from the point of view of reducing the number of parts and to make is easy to exchange the rear parts if, as shown in FIGS. 5A and 5B, the whole of the HDD group installation drawer 19 slides and the rear parts are fixed. Further, an extendable rail 25 may be provided in place of the cable 63 in a constitution in which only the HDD group installation drawer 19 is withdrawn. In such a case, when the HDD group installation drawer 19 is withdrawn, the rail 25 extends (that is, grows longer) in a direction that is the reverse of the depth direction and contracts (that is, grows shorter) in the depth direction when the HDD group installation drawer 19 is pushed in.

The method of withdrawing the HDD group installation drawer 19 is not limited to the method shown in FIGS. 5A and 5B. A variety of variations may be considered. A variety of variations will be described in the second embodiment example (described subsequently).

Further, in the first embodiment, as mentioned earlier, a plurality of HDDs 23 is arranged in the directions of two dimensions in the HDD group installation drawer 19 and this plurality of HDDs 23 is arranged at equal intervals in the row direction (that is, in a direction that is orthogonal to the depth direction and not in a vertical direction). As a result, it is possible to make uniform the air stream flowing through the long space (referred to as an 'intercolumn path' hereinafter) in the depth direction that arises between one column and an adjacent column. Further, this fact is described in detail below.

Figure 6A:
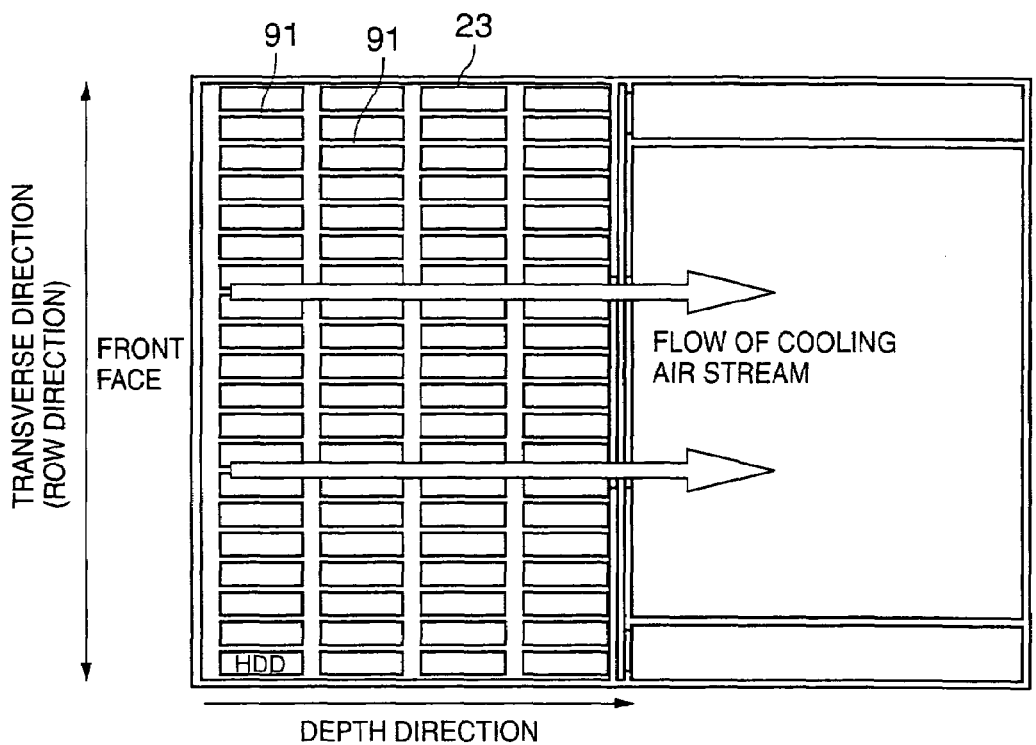
FIG. 6A shows the appearance of the flow of an air stream when an HDD 23 is mounted in all the HDD mounting portions 31 of the HDD group installation drawer 19.
Figure 6B:
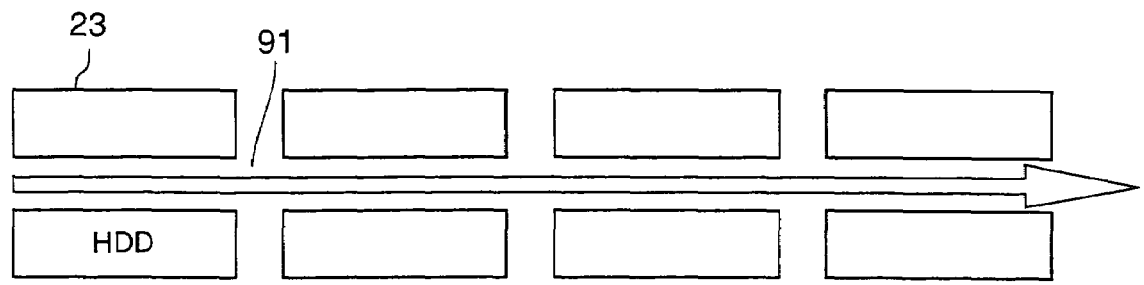
FIG. 6B is an enlarged view of an intercolumn path in FIG. 6A.

FIG. 6A shows the appearance of the flow of an air stream when an HDD 23 is mounted in all the HDD mounting portions 31 of the HDD group installation drawer 19. FIG. 6B is an enlarged view of an intercolumn path in FIG. 6A.

When an HDD 23 is mounted in all the HDD mounting portions 31 of the HDD group installation drawer 19, the widths of all of the intercolumn paths 91 are the same length. Further, the width of the respective intercolumn paths (that is, the paths for the air stream that flows from the front side to the rear side) 91 is constant from the end of the front side (front end) to the end of the rear side (rear end). Hence, the volume and velocity of the air stream flowing through the intercolumn paths 91 is the same for all the intercolumn paths 91. Hence, the cooling design is straightforward. For example, an air stream flowing through an intercolumn path 91 is hotter on the rear-end side of the intercolumn path 91 than on the front-end side thereof due to the heat generated by the HDD 23. The cooling design can be executed based on that fact.

FIG. 7A shows an example of one variation on the cooling design.

For example, a SAS-HDD reaches a high temperature more readily than a SATA-HDD (in other words, readily emits more heat). This is thought to be because the number of rotations per unit of time is higher for a SAS-HDD than for a SATA-HDD, for example. For this reason, when a SAS-HDD is disposed on the front side of the basic enclosure 1A and a SATA-HDD is disposed further toward the rear side, the SATA-HDD disposed on the rear side receives hot air. As a result, the cooling efficiency of a SATA-HDD is poor.

Therefore, as shown in FIG. 7A, SATA-HDDs (SATA-HDDs arranged in the row direction, for example) are mounted on the front side of the HDD group installation drawer 19 (that is, on the upstream-side in the air flow direction) and SAS-HDDs (SAS-HDDs arranged in the row direction, for example) are mounted on the rear side of the HDD group installation drawer 19 (that is, on the downstream side in the air flow direction). More specifically, SATA-HDDs are mounted throughout the one or more rows on the front side, and SAS-HDDs are mounted throughout the one or more rows on the rear side, as shown in FIG. 7A, for example. As a result, the SATA-HDDs receive an air stream at a lower temperature than when the SAS-HDDs are disposed closer to the front side than the SATA-HDDs (more specifically, an air stream that has not been deprived of the heat of any HDD or that has the heat taken from the SATA-HDDs that are at a lower temperature than the SAS-HDDs). Hence, in comparison with a case where the SAS-HDDs are disposed closer to the front side than the SATA-HDDs, the cooling efficiency of the SATA-HDDs can be raised. Further, the air stream received by the SAS-HDDs is at a higher temperature than in a case where the SAS-HDDs are disposed closer to the front side than the SATA-HDDs. However, because the air stream is at a lower temperature than the temperature of the SAS-HDD, cooling of the SAS-HDDs can also be performed. That is, in comparison with a case where the SAS-HDDs are disposed closer to the front side than the SATA-HDDs, the overall cooling efficiency can be increased.

FIG. 7B shows an example of another variation on the cooling design.

In a case where HDDs 23 are mounted on all the HDD mounting portions 31 of the HDD group installation drawer 19, the widths of all the intercolumn paths 91 are the same length as mentioned earlier. Consequently, the volume and velocity of the air stream flowing through the intercolumn paths 91 is also the same for the other intercolumn paths 91. However, HDD 23 may not be installed in all the HDD mounting portions 31. In this case, the width at a certain point of a certain intercolumn path 91 differs from the width at other points. Hence, the possibility that the cooling efficiency will drop exists.

Therefore, as shown in FIG. 7B, a dummy HDD 94 is inserted in a vacant HDD slot 83F in which an HDD 23 has not been inserted. Here, the dummy HDD 94 may be any dummy as long as same is a solid body with the same volume and shape as the HDD 23. For example, the dummy HDD 94 may be a different box with the same volume and shape as the HDD 23.

Therefore, because the width at any point of the intercolumn path 91 is rendered the same by inserting the dummy HDDs 94 in vacant HDD slots 83F, a drop in cooling efficiency can be prevented.

Further, the dummy HDDs 94 may be located anywhere as long as same are inserted in vacant HDD slots 83F. For example, dummy HDDs 94 may be distributed equally throughout the HDD group installation drawer 19 or may be arranged concentrated in a certain location. More specifically, for example, HDDs (SATA-HDDs, for example) may be arranged in the first row closest to the front face (the row closest to the air stream opening), HDDs (SAS-HDDs, for example) may be arranged in the mth row (m=4, for example) that is furthest from the front face, and dummy HDDs 94 may be installed throughout at least one row between the first and mth rows.

Further, when an HDD is removed from a certain row and a first vacant HDD slot 83F becomes available, a second vacant HDD slot 83F may be prepared by removing an HDD from an HDD slot 83 in another row and then inserting the HDD thus removed into the first vacant HDD slot 83F, for example. A dummy HDD 94 may be inserted into the second vacant HDD slot 83F thus prepared to replace the HDD 23. That is, the dispositional relationship between the HDD 23 and the dummy HDD 94 can be chosen by the user.

Further, as mentioned earlier, a door, which is in a closed state when the HDD 23 is pressed into the opening of the HDD slot 83 to open same and there is no HDD 23 and/or when the HDD 23 is inserted completely, for example, may be provided. In other words, a shutter, which prevents the opening of the HDD slot 83F from being opened when an HDD 23 is not inserted may be provided at the opening of the HDD slot 83.

Further, the state display lamps 81A and 81B corresponding with each of the HDD slots 83 (see FIGS. 2B and 4A) execute a display that corresponds with a case where a dummy HDD 94 has been inserted into the HDD slots 83 (that is, the user is notified that the dummy HDD 94 has been inserted). Hard control can also be implemented by means of computer control by the controller units 37A and 37B. For example, the face opposite the HDD group mounting substrate 21 of the dummy HDD 94 comprises a projection of a certain length and the HDD group mounting substrate 21 comprises a contact point for detecting contact with the projection. When the dummy HDD 94 is inserted and the projection makes contact with the contact point, the state display lamps 81A and 81B may execute a corresponding display (the flicker of a green lamp, for example).

In addition, the state display lamps 81A and 81B corresponding with each HDD slot 83 may execute a display that corresponds with a status other than a status that indicates that the dummy HDD 94 has been inserted. For example, when the HDD 23 is inserted and an error is not detected with the HDD 23, the controller units 37A and 37B may cause the state display lamps 81A and 81B corresponding with the HDD slot 83 into which the HDD 23 has been inserted to execute a display (a red lamp lights up, for example) that represents an active status. Further, in a case where the HDD 23 has been inserted and an error with the HDD 23 is detected, for example, the controller units 37A and 37B may cause the state display lamps 81A and 81B corresponding with the HDD slot 83 into which the HDD 23 has been inserted to execute a display indicating a fault (green lamp is goes out, for example). Further, upon detecting that the lock control button 35 has been pressed, the controller units 37A and 37B may render the display of the state display lamps 81A and 81B of the column corresponding with the lock control button 35 an aspect that corresponds with such detection (a green lamp and red lamp may light up alternately, for example). As a result, the user learns that an HDD 23 has been removed from an HDD slot 83 belonging to any column and hence the erroneous removal of an HDD 23 that is not intended by the user can be prevented. Further, when it is detected that the eject button 85 of a certain HDD slot 83 belonging to a column corresponding with the lock control button 35 has been pressed, the controller units 37A and 37B may cause the state display lamps 81A and 81B corresponding with the certain HDD slot 83 to execute a display (flicker of a green lamp, for example) that signifies that removal of the HDD 23 is allowed.

Variations in the cooling design were described above. However, the details of the cooling design are not limited to the examples above. Rather, a variety of other variations may be considered. Such a variation will be described by means of a subsequent fourth embodiment example.

Figure 8:
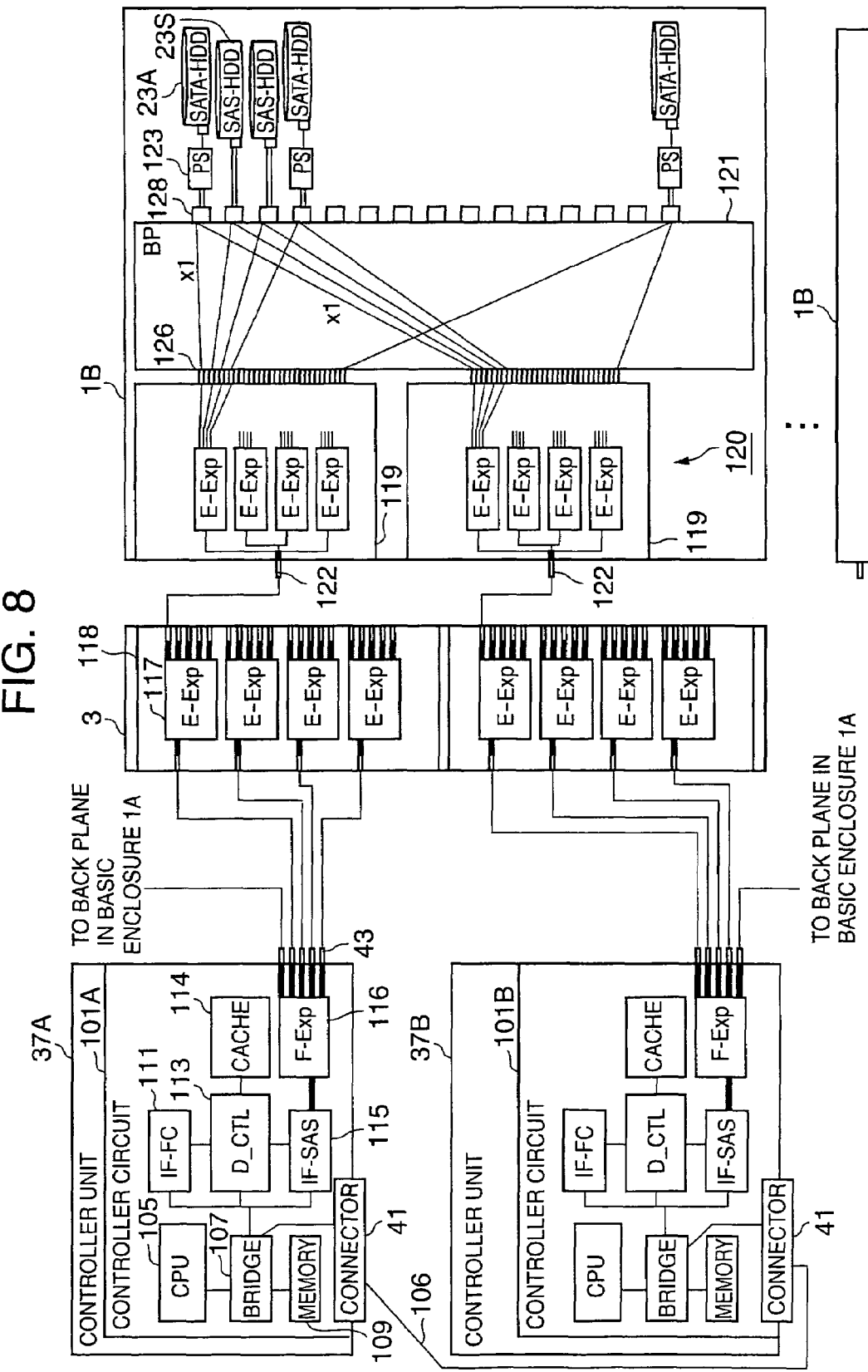
FIG. 8 shows an example of the constitution within the controller units 37A and 37B, an example of the constitution within the switch enclosure 3, an example of the constitution within the expansion enclosure 1B, and an example of the constitution of the connection between the controller units 37A, 37B and the expansion enclosure 1B.

FIG. 8 shows an example of the constitution within the controller units 37A and 37B, an example of the constitution within the switch enclosure 3, an example of the constitution within the expansion enclosure 1B, and an example of the constitution of the connection between the controller units 37A, 37B and the expansion enclosure 1B.

The controller units 37A and 37B are provided with controller circuits 101A and 101B respectively. Because the constitution of the controller circuits 101A and 101B is the same, when this is described taking the controller circuit 101A as a representative example, the controller circuit 101A comprises a CPU 105, a bridge circuit (abbreviated to 'Bridge' in FIG. 8) 107, a Fibre Channel Interface circuit (abbreviated to 'IF-FC' in FIG. 8) 111, a cache memory (abbreviated to 'Cache' in FIG. 8) 114, a data transfer control circuit (abbreviated to 'D_CTL') in FIG. 8) 113, a SAS interface circuit (abbreviated to 'IF-SAS' in FIG. 8) 115, a fanout expander (abbreviated to 'F-Exp' in FIG. 8) 116, and a main memory (abbreviated to simply 'memory' in FIG. 8) 109. The CPU 105 performs centralized control of the controller circuit 101A (control of each element of the controller circuit, for example). The bridge circuit 107 controls the connection between each of the elements of the controller circuit that are connected to the Bridge 107 (CPU 105, main memory 109, and so forth) and the elements of another controller circuit that are connected to the Bridge 107. The IF-FC 111 is a circuit in which a chip for processing the FC (Fibre Channel) protocol is installed and to which a host device (not shown) is connected via a SAN (Storage Area Network), for example. The Cache 114 is a memory for the temporary storage of data that is written to the HDD 23, data that is read from the HDD 23, and so forth. The IF-FC 111, cache memory (abbreviated to 'Cache' in FIG. 8) 114, and D_CTL 113 control data transfers between each of the elements of the controller circuit that are connected to the D_CTL 113 and the elements of another controller circuit that are connected to the D_CTL 113. The IF-SAS 115 is a circuit in which a chip that processes the SAS protocol is installed and which communicates with a SAS-HDD 23S via an F-Exp 116. The F-Exp 116 is one type of switch circuit that comprises j (j is an integer of one or more) first ports that are connected to the IF-SAS 115 and k (k>j) second ports that are connected to a plurality of rear-side connectors 43 of the controller unit 37A. The memory 109 may be a ROM for storing a computer program that is read to the CPU 105 or may be RAM that comprises a work region for the CPU 105. The front-side connector 41 may be connected to the Bridge 107 and may be connected to the front-side connector 41 of the controller unit 37B via a path 106. As a result, the controller circuit 101A is able to access the other controller circuit 101B. For example, the controller circuit 101A may write data read from the HDD 23 to the Cache 114 and may write data to the Cache in the controller circuit 101B via the path 106.

One or more (two, for example) switch devices 118 may be provided in the switch enclosure 3. Each of the switch devices 118 may be provided with a plurality of edge expanders (abbreviated to 'E-Exp' in FIG. 8) 117. The E-Exp 117 is one kind of switch circuit that comprises p (p is an integer of one or more) first ports that are connected to the controller unit 37A or 37B and q (q>p) second ports that are connected to one or more expansion enclosures 1B.

The expansion enclosure 1B comprises a disk connection portion 120, a plurality of HDD 23, and a back plane (abbreviated to 'BP' hereinafter) 121 that connects the disk connection portion 120 and the plurality of HDD 23.

A switch portion 119 in the expansion enclosure of the disk connection portion 120 implements the same processing as the switch portion 118.

A BP 121 has a first port 126, which is connected to the switch portion 119 in the expansion enclosure, and a second port 128, which is connected to the HDD 23. A second port set 128 of the BP 121 has two second ports (not shown) and, connected to these two second ports via the switch device 118 and switch portion 119 in the expansion enclosure are the two controller circuits 101A and 101B respectively. In cases where the HDDs 23 connected to the two second ports are SAS-HDD 23S, the SAS-HDDs 23S have two connectors 32. Hence, the SAS-HDDs 23S are connected directly to the two second ports (to one second port set 128). On the other hand, in cases where the HDDs 23 connected to the two second ports are SATA-HDDs 23A, the SATA-HDDs 23A have one connector 32, and hence the SATA-HDDs 23A are connected via a path switch (abbreviated to 'PS' hereinafter) 123 to two second ports (to one second port set 128). The PS 123 is a device (a chip, for example) that comprises two first ports that are connected to the second port set 128 and one second port that is connected to the SATA-HDD 23A.

As a result of the above constitution, the two controller circuits 101A, 101B are able to access each SATA-HDD 23A and each SAS-HDD 23S. That is, the two controller circuits 101A and 101B are able to manage all of the HDDs 23 provided in the storage subsystem 1 individually. Further, the constitution of the connection between the HDDs 23 in the expansion enclosure 1B and the BP 121 can be applied to the constitution of the connection between the HDDs 23 in the basic enclosure 1A and the BP 17. Further, the constitution within the controller units 37A and 37B, the constitution within the SW enclosure 3, the constitution within the expansion enclosure 1B, and the constitution of the connection between the controller units 37A and 37B and each HDD 23 are not limited to the above example(s). Rather, several variations may be considered. Such a variation will be described by means of a fifth embodiment example (described subsequently).

Figure 9:
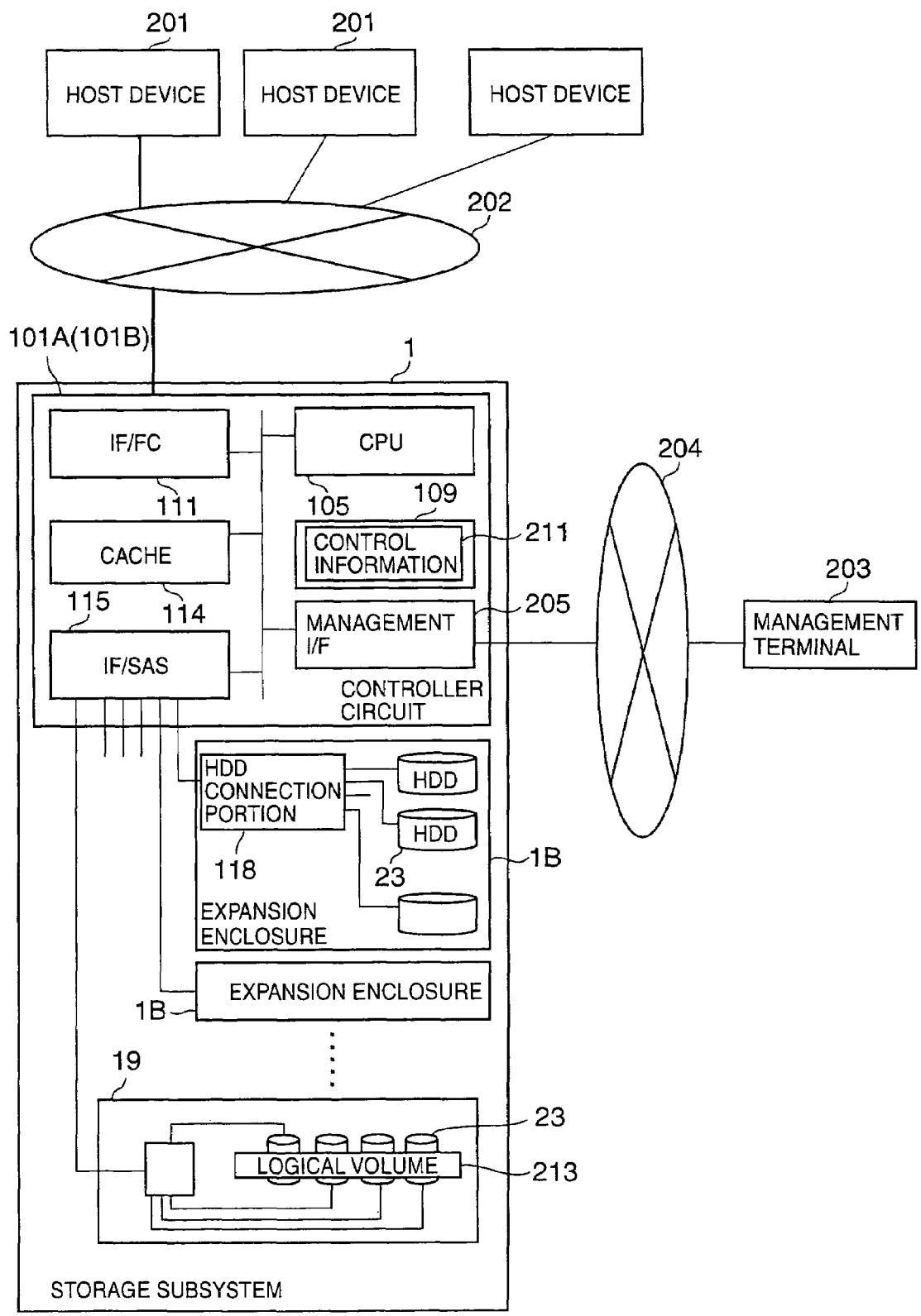
FIG. 9 shows an example of the constitution of the network in a case where the storage subsystem 1 is connected to a communication network.

FIG. 9 shows an example of the constitution of the network in a case where the storage subsystem 1 is connected to a communication network.

The controller circuit 101A (and/or 101B) is provided with a management I/F 205 that functions as an interface for a management terminal 203. The management terminal 203 is connected to the management I/F 205 via a communication network (a LAN, for example) 204. The management terminal 203 is a computer machine (a personal computer or server machine, for example) that comprises a CPU, memory, and so forth. The CPU 105 is able to communicate with the management terminal 203 via the management I/F 205. Further, the management terminal 203 may be connected to the management I/F 205 by means of a single cable.

A logical storage device ('logical volume' hereinafter) 213 is prepared on one or more HDDs 23. A group of one or more HDDs 23 that comprise the logical volume 213 is referred to as a 'parity group' hereinbelow. Further, the types of the one or more HDDs that are present in one parity group may all be the same or may be different. If the types of the one or more HDDs are all the same, the reliability of the constitutional elements (HDD) of the parity group is the same. If the types differ, the constitution and disposition of the HDD are afforded greater freedom.

A host device 201 is connected to the IF-FC 111 of the controller circuit 101A (and/or 101B) via a communication network (a SAN, for example) 202. In this case, the IF-FC 111 functions as an interface circuit for the host device. The CPU 105 receives a write command or read command from the host device 201 via the IF-FC 111 and executes write processing or read processing in response to this write command or read command. In the case of write processing, for example, the CPU 105 receives data from the host device 201, writes the received data to the Cache 114, and then reads this data from the Cache 114 before storing same in the logical volume 213 (in other words, one or more HDDs 23). In the read processing, the CPU 105 writes the data read from the HDD 23 to the Cache 114 and then reads the data from the Cache 114 before sending same to the host device 201, for example. Further, the communication networks 202 and 204 may be the same communication networks.

Control information 211 is prepared in the main memory 109. The control information 211 comprises data representing the relationship of correspondence between the HDDs 23 and the logical volume 213. More specifically, for example, the control information 211 includes a volume identifier (a number, for example) for each logical volume 213, information relating to the parity group constituting the logical volume 213 (information on each HDD 23, for example (one example is the position, type and identifier thereof)), and the RAID level of the logical volume 213. The control information 211 also includes information relating to a backup HDD ('backup HDD' hereinafter) 23 that does not constitute the logical volume 213 (the position, type and identifier (a WWN (World Wide Name), for example) thereof, for example). The CPU 105 is able to update the control information 211 in the main memory 109. For example, upon detecting removal of an HDD 23, the CPU 105 specifies the position at which the HDD 23 was removed (specifies the position based on which eject button 85 of which HDD slot 83 has been pressed, for example), and may then erase information on the HDD corresponding with the specified position from the control information 211. Further, for example, in a case where the mounting of an HDD 23 has been detected, the CPU 105 may acquire information relating to the HDD 23 (the CPU 105 may send a predetermined command and receive information on the HDD 23 from the HDD 23 in response to the command, for example) and may include the acquired information in the control information 211. Further, the control information 211 may be information that is inputted by the management terminal 203. Further, the control information 211 may be updated by the management terminal 203. Further, the information on each HDD 23 included in the control information 211 may include the status ('active', 'faulty', 'maintainable', 'standby', and 'in-preparation', for example) of each HDD 23 detected by the CPU 105. Further, the type of each HDD 23 included in the control information 211 may be automatically detected by the CPU 105. In cases where it is detected that the HDD has been accessed directly without passing via the PS above, for example, the CPU 105 may judge that the HDD is a SAS-HDD and, when it is detected that the HDD has been accessed via the PS, the CPU 105 may judge that the HDD is a SATA-HDD. Alternatively, the CPU 105 may send a predetermined command (a SCSI device discovery command, for example) to each HDD 23 and detect the type of each HDD 23 on the basis of the information that has been sent back from each HDD 23 in response to the command.

The CPU 105 is able to generate a GUI screen (illustrated below) on the basis of the control information 211 and display the GUI screen on the management terminal 203.

Figure 10A:
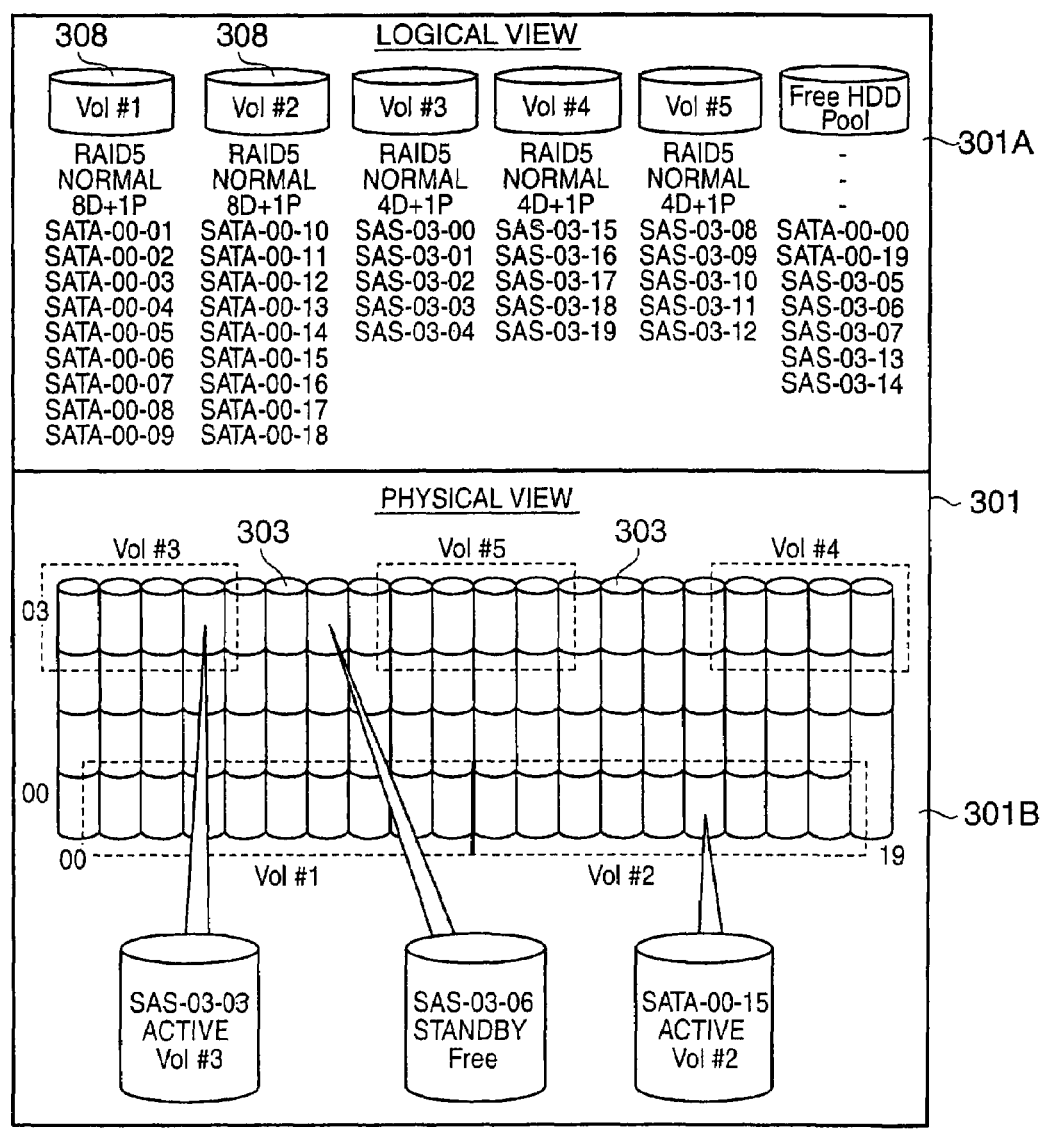
FIG. 10A shows an example of a GUI screen that is displayed on a management terminal 203 when a fault has not occurred.

FIG. 10A shows an example of a GUI screen that is displayed on the management terminal 203 when a fault has not occurred. The HDD information that is displayed on the GUI screen is information on the HDDs that exist in a enclosure (basic enclosure 1A, for example) that has been designated by the user.

A GUI screen 301 is divided into a first subscreen 301A and a second subscreen 301B.

The CPU 105 displays information on the logical volume 213 on the first subscreen 301A. More specifically, for example, the CPU 105 displays one or more volume graphics 308 that correspond with one or more logical volumes 213 and, based on the control information 211, displays an identifier for each logical volume 213, information on the parity group constituting the logical volume 213, and the RAID level of the logical volume 213 near each volume graphic 308. Further, the CPU 105 also displays information on one or more backup HDD 23 (the type and identifier, for example) on the first subscreen 301A. Further, the CPU 105 may display the type (SAS or SATA, for example) of the HDD 23 corresponding with the HDD graphic 303 within the HDD graphic 303.

In addition, the CPU 105 displays information on a plurality of HDD 23 that are installed in the storage subsystem 1 on the second subscreen 301B on the basis of the control information 211. For example, the CPU 105 displays information on all the HDDs 23 that exist in each of the enclosures 1A, 1B or on the HDDs 23 that exist in a enclosure that is specified by the user. The second subscreen 301B shown in FIG. 10A displays information on the HDDs 23 that exist in the basic enclosure 1A.

For example, the CPU 105 prepares locations on the second subscreen 301B ('HDD display locations' hereinbelow) that correspond with a plurality of positions (positions of a plurality of HDD mounting portions 31) in the HDD group installation drawer 19 and displays a graphic representing an HDD ('HDD graphic' hereinbelow) 303 at these HDD display locations. Thereupon, when the number of rows is four, for example, the CPU 105 displays the number of the row closest to the front face of the basic enclosure 1A (or expansion enclosure 1B) as '00' and displays the number of the row furthest from the front face of the basic enclosure 1A (or expansion enclosure 1B) as '03'. Further, the CPU 105 displays information on what kind of logical volume is constituted by an HDD in a particular position (for example, one or more HDD graphics corresponding with one or more HDDs comprising a logical volume are framed and the identifier of the logical volume is displayed near the frame). Further, the CPU 105 may not display HDD graphics in positions in which HDDs do not exist or may display a different form of display from the display form (red, for example) of the HDD graphics in positions where HDDs exist. In addition, in cases where a certain HDD graphic is designated by the user (when clicked on with a mouse, for example) the CPU 105 may extract information on the HDD corresponding with the HDD graphic (type, identifier, status and logical volume identifier, for example) from the control information 211 and then display this information. Further, the illustrated status known as 'standby' is a backup HDD status that signifies that one of the HDDs constituting the logical volume can be integrated, for example.

Figure 10B:
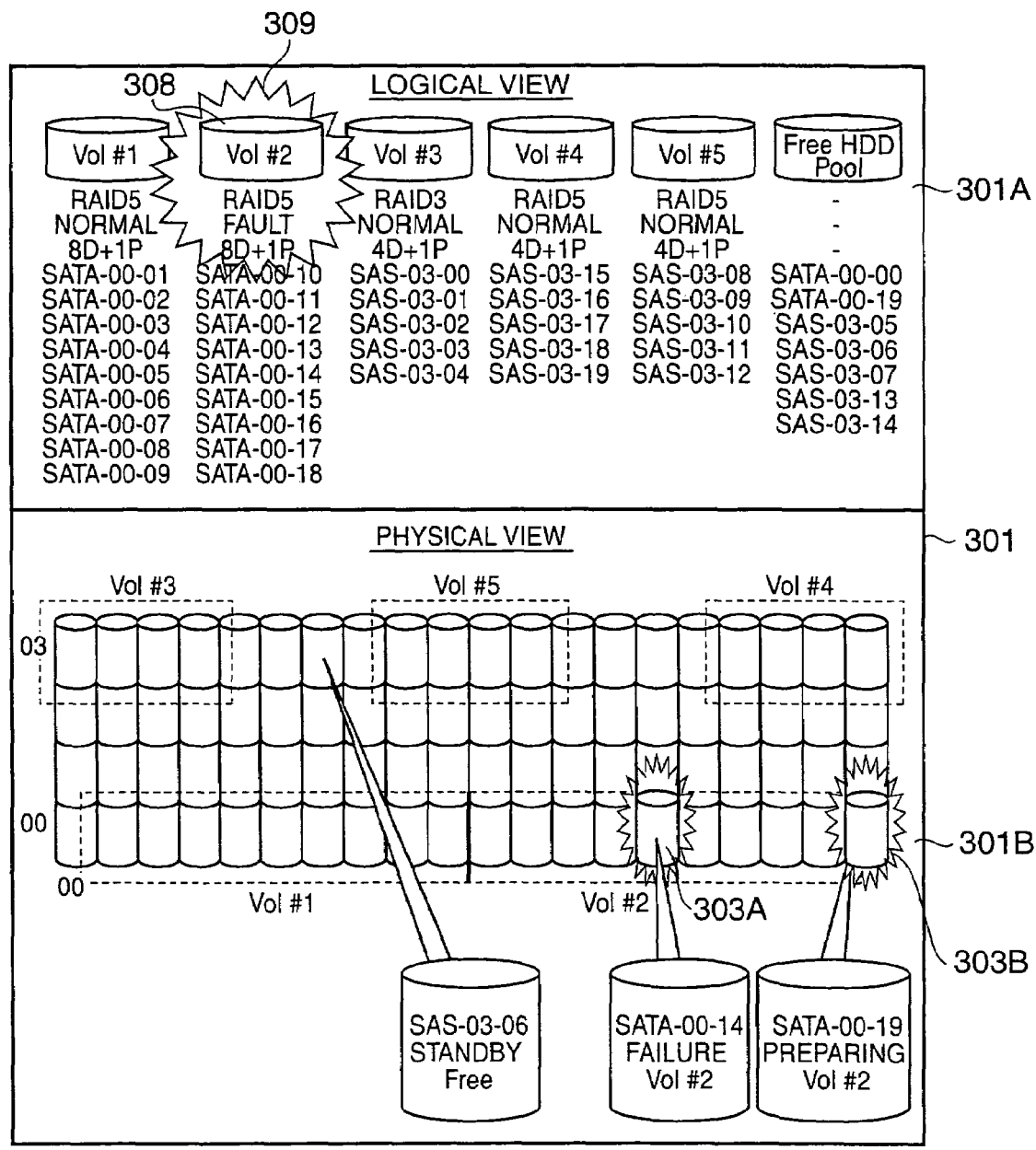
FIG. 10B shows an example of a GUI screen that is displayed on the management terminal 203 when a fault has occurred.

FIG. 10B shows an example of a GUI screen that is displayed on the management terminal 203 when a fault has occurred. FIG. 10B is for a case where a fault has arisen with a certain HDD 23 that comprises a logical volume with the logical volume identifier '#2'.

Upon detecting that a fault has occurred in a certain HDD 23 (in a case where no response is received from the HDD 23 even when access is retried a predetermined number of times, for example), the CPU 105 references the control information 211 to specify the identifier of the logical volume 213 that comprises the HDD ('faulty HDD' hereinbelow) 23 in which a fault has been detected. Further, the CPU 105 highlights graphic 308 of the logical volume 213 with a specified identifier '#2' on the first subscreen 301A (the graphic 308 is circled by a bomb mark 309, for example). The CPU 105 also displays 'redundant' as the status of the logical volume 213 with the identifier "#2".

Further, the CPU 105 highlights an HDD graphic 303A at the HDD display location corresponding with the position of the faulty HDD 23 on the second subscreen 301B. Further, the CPU 105 displays information on the faulty HDD 23 (the type, 'faulty' status, and logical volume identifier, for example) so that this information is associated with the HDD graphic 303A.

Thus, the CPU 105 is able to inform the user of the nature of the fault when a fault has occurred in the storage subsystem 1. The CPU 105 may detect a recovery-in-progress status and display this status on the second subscreen 301B. For example, when the CPU 105 receives an instruction from the management terminal 203 to include 'standby' status HDDs in one of the parity groups comprising a certain logical volume, the CPU 105 includes these HDDs in one of the parity groups and may accordingly execute HDD integration processing, which increases the storage capacity of the certain logical volume. Further, here, if the HDD integration processing has started, the CPU 105 may switch the status of the HDD to be processed from 'standby' to 'in preparation' and, as shown in FIG. 10B, display the 'in preparation' status so that same is associated with an HDD GRAPHIC 303B that corresponds with the HDD to be processed. Further, if the HDD integration processing is complete, the CPU 105 may switch the status of the HDD to be processed from 'in preparation' to 'active' and display the 'active' status so that same is associated with the HDD GRAPHIC 303B corresponding with the HDD to be processed.

Figure 11:
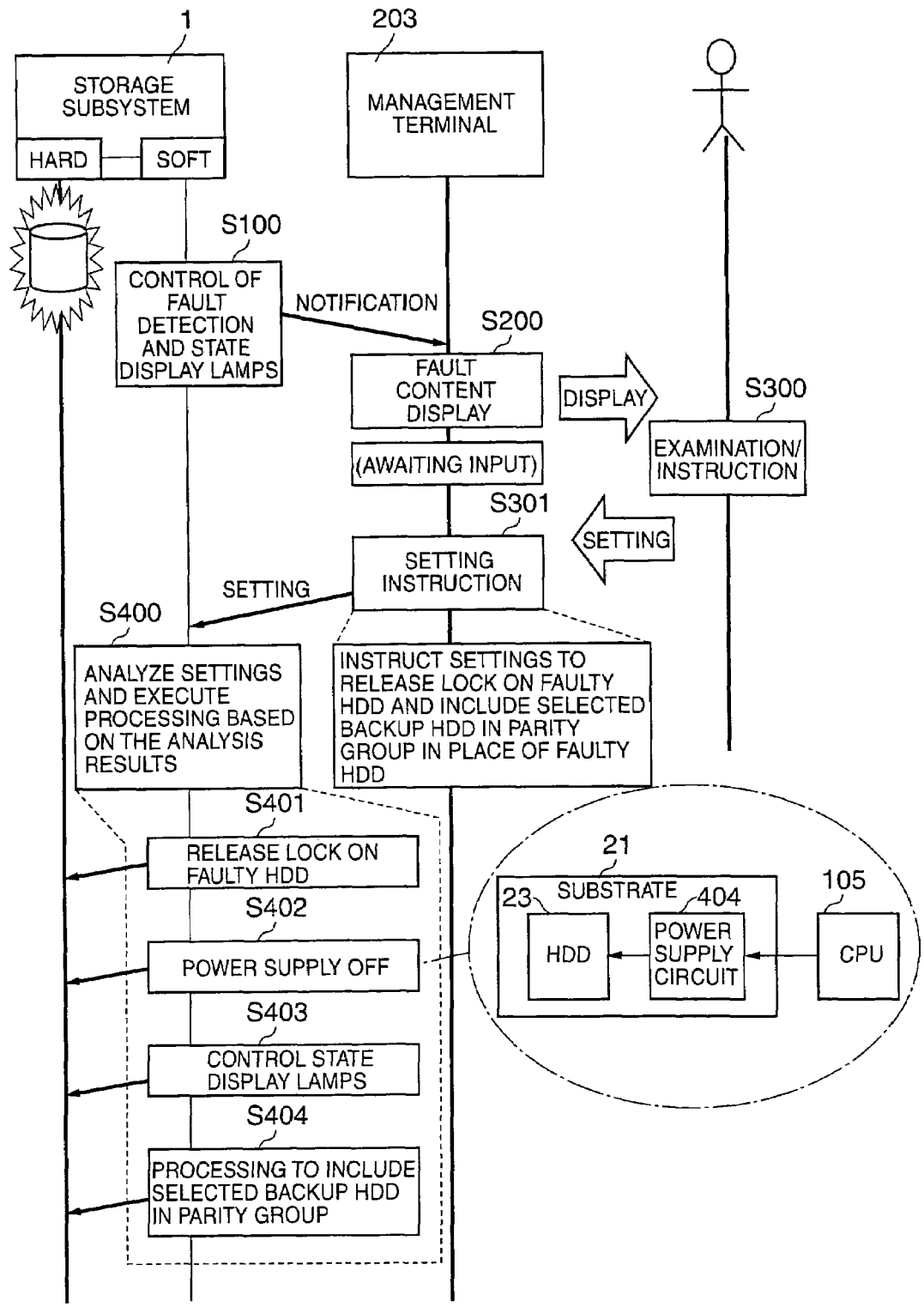
FIG. 11 shows an example of the flow of processing that is executed up until a fault is recovered after a fault occurs with an HDD.

FIG. 11 shows an example of the flow of processing that is executed up until a fault is recovered after a fault occurs with an HDD.

When a fault has occurred with a certain HDD 23, the fault is detected by the CPU 105. Thereupon, the CPU 105 causes the first state display lamps 81A and 81B (see FIG. 4A) that correspond with the faulty HDD 23 to execute a display that signifies that a fault has occurred. The CPU 105 also causes the second state display lamp 33 corresponding with the column to which the faulty HDD 23 belongs to execute a display that signifies that a fault has occurred in that column (step S100) The CPU 105 displays a GUI screen 301, on which information on the HDD 23 (the position, status, and the like, for example) in which the fault has occurred is placed, on the management terminal 203 on the basis of the control information 211 (S200) A user 401 of the management terminal 203 views the GUI screen 301 displayed on the management terminal 203, examines the strategy regarding which settings are to be made for the storage subsystem 1, and then uses the management terminal 203 to make settings for the storage subsystem 1 based on the examination results (S300, S301). The CPU 105 of the storage subsystem 1 analyses the content of the settings and then executes processing based on the results of the analysis (S400).

A specific example of S301 and S400 will be provided below.

In S301, the management terminal 203 releases the lock on the faulty HDD 23 in accordance with an operation by the user 401 and then inputs the settings to include the backup HDD selected by the user ('selected backup HDD' hereinbelow) in the parity group that includes the faulty HDD 23 to the storage subsystem 1.

The CPU 105 of the storage subsystem 1 then releases the lock on the faulty HDD 23 by controlling the lock mechanism 87 of the faulty HDD 23 in accordance with the settings thus inputted (S401). Thereupon, the CPU 105 may change the status of the faulty HDD 23 from 'faulty' to 'maintainable' and display the changed status on the management terminal 203 so that the changed status is associated with the HDD graphic of the faulty HDD 23. Further, the CPU 105 may also release the lock on all of the HDD 23 that constitute the parity group (hereinafter 'faulty group') that includes the faulty HDD 23. This serves to enable HDD replacement in parity group units. Further, the CPU 105 may not access the HDD 23 whose lock has been released (for example, in a case where a write command or read command for the logical volume that the HDD 23 comprises has been received, notification to the effect that access is now prohibited may be sent back to the host device). Further, the CPU 105 may issue notification that the lock control button 35 corresponding with the column of the faulty HDD 23 has been pressed (the display of the second state display lamp 33 is controlled to provide notification to that effect, for example) and the lock of the faulty HDD 23 may be released after it is detected that the lock control button 35 has been pressed by way of response.

Further, the CPU 105 turns OFF the power supply of the faulty HDD 23 in accordance with the inputted settings (S402). The CPU 105 may then turn OFF the power supply of all the HDD 23 constituting the faulty group. As the method for turning OFF the power supply, a method in which, in a case where the HDD group mounting substrate 21 is provided with a power supply circuit 404 that supplies electrical power to the HDD 23, the CPU 105 turns OFF the power supply of the HDD 23 by sending a power supply turn-OFF command to the power supply circuit 404, may be considered.

Further, the CPU 105 may cause the first state display lamps 81A and 81B corresponding with the faulty HDD 23 to execute a display to the effect that the lock on the faulty HDD 23 has been released (S403).

The CPU 105 also executes processing to include the selected backup HDD 23 in the parity group in place of the faulty HDD 23 (S404). For example, the CPU 105 updates the control information 211 to information that includes content indicating the fact that the selected backup HDD 23 is included in the faulty group in place of the faulty HDD 23.

The first embodiment example was described above. Further, in the first embodiment example, instead of withdrawing or pushing in the HDD group installation drawer 19 and mounting or removing the HDD 23, the constitution is such that the upper faces of the enclosures 1A and 1B open and close such that mounting or removal of the HDD 23 may be performed by opening these upper faces. The upper faces of the enclosures 1A and 1B may be opened and closed by turning the enclosures 1A, 1B with a certain edge serving as the axis or may be opened and closed by sliding along the upper faces in the directions of two dimensions, for example. According to the above first embodiment example hereinabove, a plurality of HDDs 23 may be arranged upright in the depth direction of the enclosures 1A and 1B.

As a result, HDDs 23 can be provided at a high density within a fixed space. As a result, a higher performance and capacity for the storage subsystem 1 are also possible.

Furthermore, according to the above first embodiment example, a plurality of HDDs 23 is arranged at equal intervals in the row direction that is orthogonal to the direction in which the cooling air stream flows. As a result, because all the widths of the intercolumn paths 91 are then the same, the volume, velocity, and so forth, of the cooling air stream passing through each intercolumn path 91 can be made uniform.

Further, according to the above first embodiment example, the lock control button 35 is provided for each column constituted by two or more HDDs and, unless the lock control button 35 corresponding with the desired column is pressed, the HDDs 23 belonging to that column cannot be removed. As a result, it is possible to prevent erroneous removal of HDDs that are present in the rows adjacent to an HDD that is to be removed and therefore maintenance work on the storage subsystem 1 can be performed accurately.

Further, several variations may be considered based on a variety of facts in the first embodiment example above. Embodiment examples for which a variety of variations has been adopted will be described hereinbelow as other embodiment examples. Further, in the following description, descriptions of points that are also common to the first embodiment example are omitted or simplified. Points of difference from the first embodiment example will mainly be described.

Second Embodiment Example

In the second embodiment, the method of withdrawing the HDD group installation drawer 19 differs from that of the first embodiment example.

Withdrawal methods include, for example, a method (referred to as the 'integrated withdrawal method' hereinafter) in which the HDD group installation drawer 19 is withdrawn integrally with the rear-side parts (the back plane 17 and the parts that exist further in the depth direction than the back plane 17) and a method (referred to as the 'separate withdrawal method' hereinafter) in which the HDD group installation drawer 19 is withdrawn separately from the back plane 17. Variations on each withdrawal method will be described below.

(A) Integrated Withdrawal Method

FIG. 12A shows a first variation on the integrated withdrawal method.

According to the first variation, a cable (hereinafter 'external cable') 77, which is connected to the rear-side connector 43 of the power supply unit 39, controller units 37A, 37B, and so forth, is drawn toward the front side and introduced to the basic enclosure 1A in accordance with the sliding action of the HDD group installation drawer 19 and, when the HDD group installation drawer 19 is pushed toward the rear side, the cable 77 is made to exit the basic enclosure 1A.

According to the first variation, the rear face of the basic enclosure 1A is open. It is therefore easy to exchange the power supply unit 39 and controller units 37A, 37B, and so forth.

FIG. 12B shows a second variation on the integrated withdrawal method from which an illustration of the slide mechanism 27 has been omitted.

According to this second variation, a boundary substrate 79 is provided near the rear face of the basic enclosure 1A.

The boundary substrate 79 is a printed substrate, for example, and the space near the rear face of the basic enclosure 1A is divided into the front side and rear side of the basic enclosure 1A. The boundary substrate 79 comprises, on the rear face thereof, a connector 81 for connecting the external cable 77 and comprises, on the front side, a connector 80 that is connected to the rear-side connector 43 of the power supply unit or the like via an internal cable 78. The position of the boundary substrate 79 is fixed and the boundary substrate 79 does not move in accordance with the insertion and withdrawal of the HDD group installation drawer 19.

Further, according to the second variation, the boundary substrate 79, power supply unit 39, and controller units 37A, 37B, and so forth are constituted as a single module, meaning that the power supply unit 39 and controller units 37A, 37B, and so forth may be exchanged for another power supply unit 39, and controller units 37A, 37B, and so forth by exchanging the module.

FIG. 12C shows a third variation on the integrated withdrawal method from which an illustration of the slide mechanism 27 has been omitted.

The third variation is a modified example of the second variation above. That is, a new connector 501 is provided on the rear face of the back plane 17 and the front-face connector 80 of the boundary substrate 79 is connected to the connector 501 via the internal cable 78. The internal cable 78 is stored in the space between the controller unit 37B and the bottom of the basic enclosure 1A. The internal cable 78 is a flexible-film-like cable, for example.

According to the third variation, the number of parts can be reduced. For example, the number of internal cables 78, the number of front-side connectors 80 of the boundary substrate 79, and the number of rear-side connectors 43 of the respective units 39, 37A and 37B can be reduced. Further, it is understood that the constitution of the printed wiring of the back plane 17 in the third variation differs from that of the first embodiment example.

(B) Separate Withdrawal Method

Figure 13A:
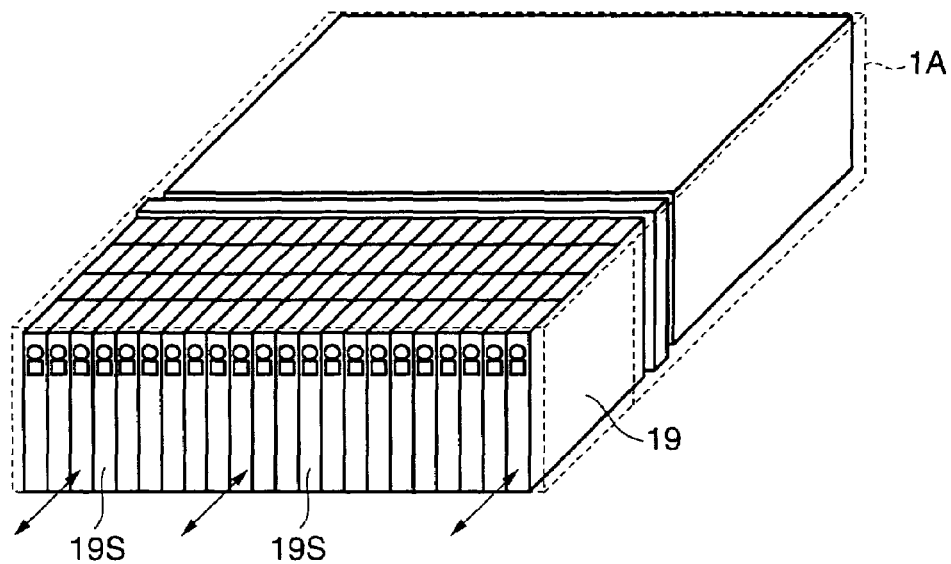
FIG. 13A provides an outline of one variation on the separate withdrawal method.
Figure 13B:
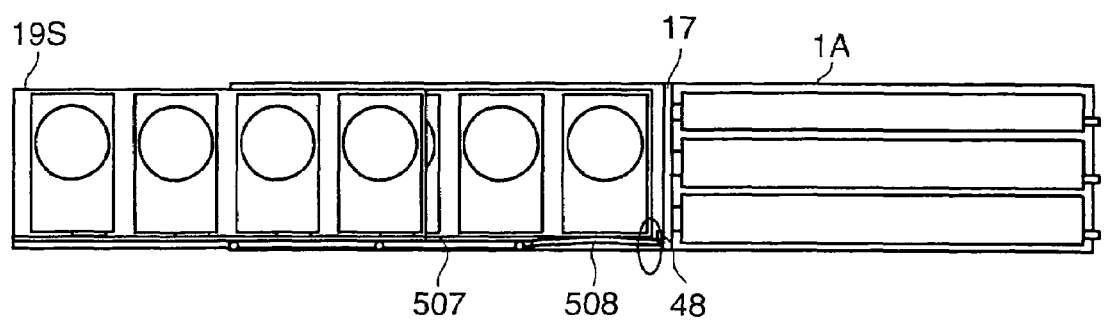
FIG. 13B serves to illustrate the variation in detail.

FIG. 13A provides an outline of one variation on the separate withdrawal method and FIG. 13B serves to illustrate the variation in detail.

According to the variation on the separate withdrawal method shown in FIGS. 13A and 13B, the HDD group installation drawer 19 is constituted by n subdrawers 19S. The value of n is an integer of two or more and a value less than the number of columns of the HDD 23. Further, in this second embodiment example, n is the same number as the number of columns of the HDD 23.

HDDs 23 that constitute one or more columns (one column in this embodiment example) are mounted in one subdrawer 19S. Each subdrawer 19S may have the constitution of the HDD group installation drawer 19. For example, each subdrawer 19S may comprise, at the bottom thereof, an HDD group installation sub-substrate for mounting the HDDs that belong to the column corresponding with the subdrawer 19S.

Each subdrawer 19S is withdrawn separately from the back plane 17 as shown in FIGS. 13A and 13B. That is, although there is no special illustration, each subdrawer 19S is provided with a slide mechanism for sliding the subdrawer 19S toward the front side and toward the rear side. As per the first embodiment example, this slide mechanism may be constituted by a rail and guide rollers.

The connector 47 of each subdrawer 19S is connected electrically to the HDD 23 that is mounted in the subdrawer 19S. Further, the connector 47 of each subdrawer 19S is connected to the front-side connector 48 of the back plane 17 via a cable 508. The cable 508 is a flexible-film-like cable, for example. As a result, in a state where the subdrawer 19S is completely housed within the basic enclosure 1A, the cable 508 is housed in a space between the subdrawer 19S and the bottom of the basic enclosure 1A (a space that has the height of the rail 25, for example. Further, in this variation, an extendable rail may be provided instead of providing the cable 508. In such a case, when the subdrawer 19 is withdrawn, the rail extends (that is, grows longer) toward the front side and contracts (that is, grows shorter) toward the rear side when the subdrawer 19 is pushed in.

Third Embodiment Example

In the third embodiment example, the removal method for the HDD 23 differs from that of the first embodiment example.

Figure 14A:
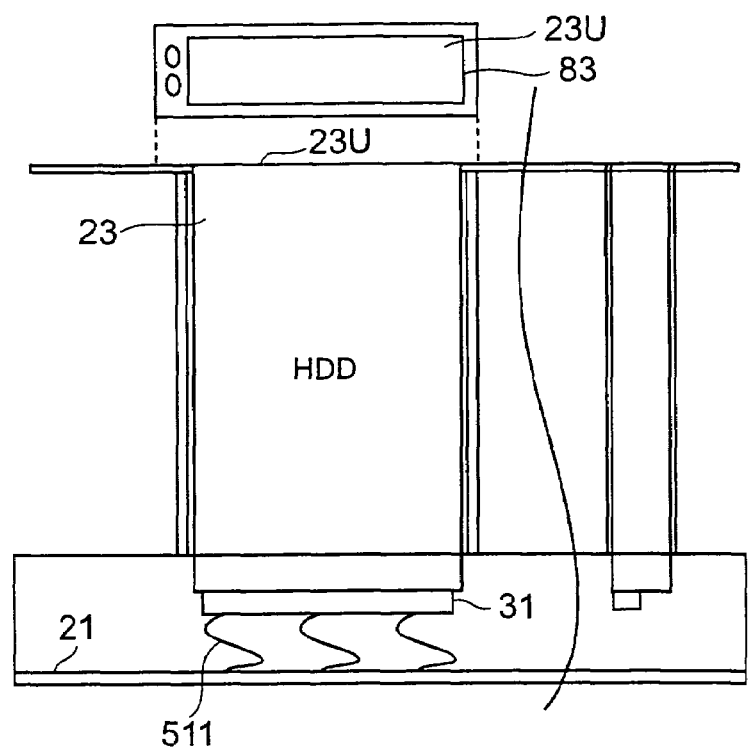
FIG. 14A shows a first variation on the removal method for the HDD 23.

FIG. 14A shows a first variation on the removal method for the HDD 23.

In the first variation, an elastic body (a spring, for example) 511 whose height runs vertically is provided between the HDD mounting portion 31 and HDD group mounting substrate 21. In this first variation, the mounting and removal of the HDD 23 is executed according to the following processing flow.

That is, the HDD 23 is pressed vertically downward for insertion into the HDD slot 83 and, when the HDD 23 no longer extends after the elastic body 511 has collapsed according to a certain measure, the elastic body 511 returns to and stops in a position below the original height thereof such that the upper face 23U of the HDD 23 is then located in the same position as the face of the HDD slot 83 or in a position below same. The HDD 23 thus enters a mounted state.

Thereafter, when the upper face 23U of the HDD 23 is pressed vertically downward and the elastic body 511 is collapsed according to a certain measure, the elastic body 511 returns to the original height and the upper face 23U of the HDD 23 is then located in a plane above the face of the HDD slot 83. The HDD 23 thus enters a removable state.

Figure 14B:
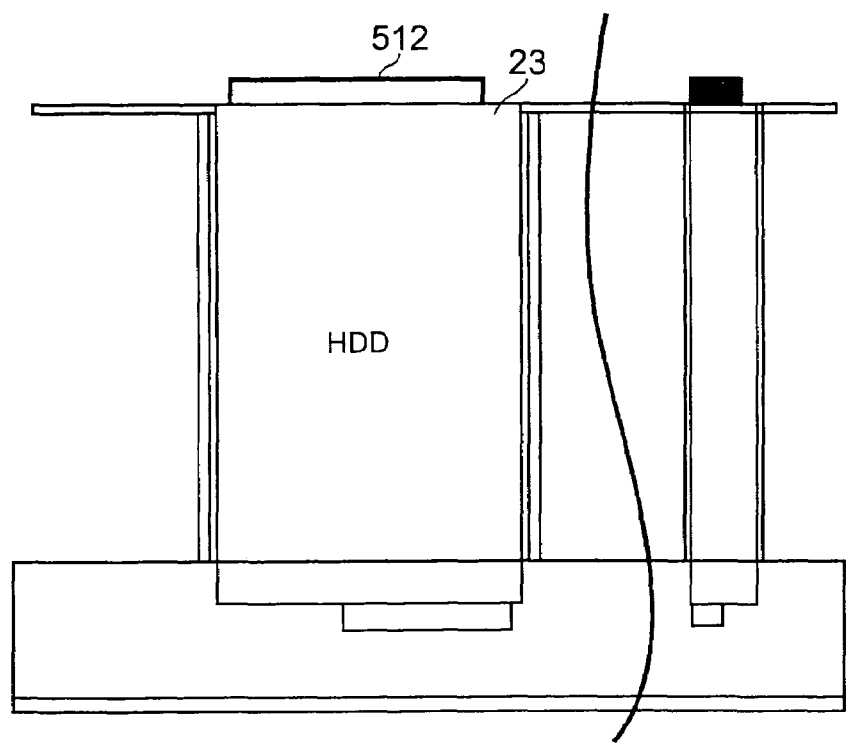
FIG. 14B shows a second variation on the removal method for the HDD 23.

FIG. 14B shows a second variation on the removal method for the HDD 23.

According to the second variation, a handle 512 is provided on the upper face of the HDD 23 (or of the canister housing the HDD 23). The user holds the handle 512 and is able to remove the HDD 23 by drawing the handle 512 upward in a vertical direction.

Further, the handle 512 may be mounted detachably on the HDD 23 (or the canister housing the HDD 23). Further, the shape of the handle 512 may be any shape as long as same can be gripped by hand. Further, in place of the handle 512, a tool for pulling out the HDD 23 may be provided by using any means (through engagement or hooking, for example) may be provided.

Fourth Embodiment Example

In a fourth embodiment example, the cooling design of the HDD 23 differs from that of the first embodiment example. That is, according to the first embodiment example, the volume (or velocity) of the air stream flowing through the intercolumn paths 91 is substantially uniform over the interval from the inlet to the outlet thereof but is not uniform in the fourth embodiment example. More specifically, for example, according to the fourth embodiment example, the flow path of the air stream narrows from the front side toward the rear side (that is, as progress is made movement in the depth direction). As a result, the air stream velocity increases in moving toward the rear side and hence the cooling efficiency of the HDDs 23 that exist on the rear side can be improved.

Figure 15A:
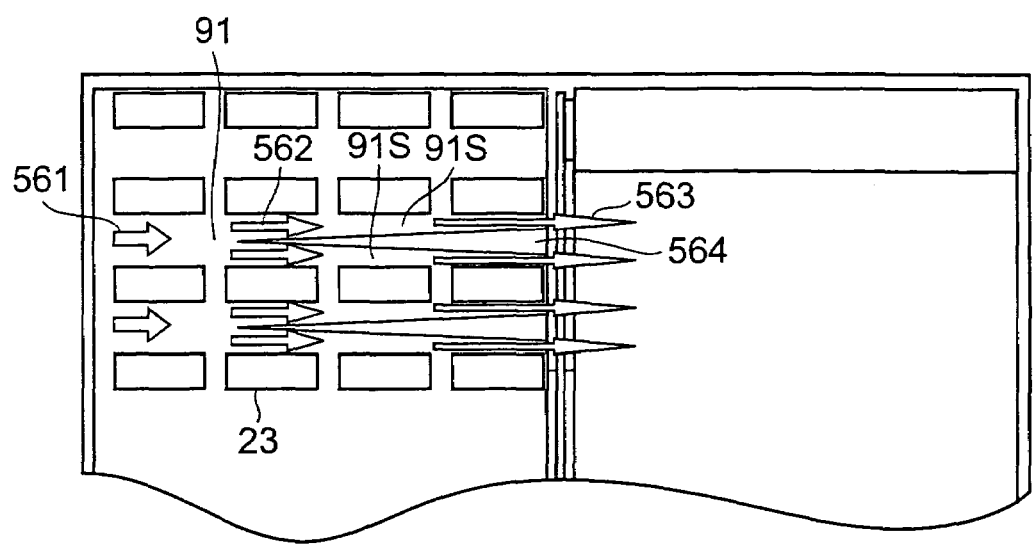
FIG. 15A shows a first variation on the cooling design for increasing the velocity of the cooling air stream on the rear side.

FIG. 15A shows a first variation on the cooling design for increasing the velocity of the cooling air stream on the rear side.

According to the first variation, a dividing member 564 that is long in the depth direction is disposed in the intercolumn path 91. The dividing member 564 splits the intercolumn path 91 into two subpaths 91S, 91S from a point that is a predetermined distance apart from the opening of the intercolumn path 91 (close to the second row, for example) and the width of the subpath 91S narrows in the depth direction. The dividing member 564 has a narrow width at the leading end (on the side opposite the depth direction) and widens at the trailing end (on the depth direction side), for example, and is a member with the same height as the height of the intercolumn path 91. Because this dividing member 564 is disposed with the leading edge facing toward the front face and the rear edge facing toward the rear face, the intercolumn path 91 is divided into two subpaths 91S, 91S, the width (that is, the interval in the row direction) of each subpath 91S growing narrower in the depth direction. As a result, the cooling air stream flowing through the intercolumn path 91 increases in velocity as same progresses in the depth direction, as indicated by the reference numerals 561 to 563.

Further, various variations are possible for the shape of the dividing member 564. The shape of the dividing member 564 may also be altered. For example, the dividing member 564 may be a plate in the form of a letter V (a metal plate, for example) such that the width between the leading edge and trailing edge can be adjusted by controlling the angle of the pointed end.

Figure 15B:
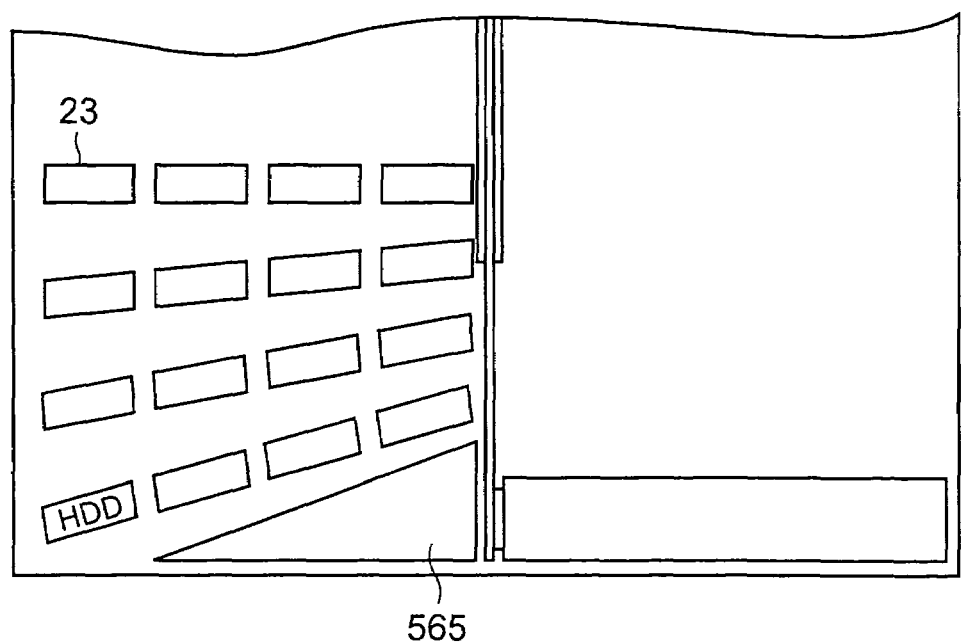
FIG. 15B shows a second variation on the cooling design for increasing the velocity of the cooling air stream on the rear side.

FIG. 15B shows a second variation on the cooling design for increasing the velocity of the cooling air stream on the rear side.

In the case of the second variation, the column formed by two or more HDDs 23 is inclined in the depth direction so that the width between adjacent columns is narrower on the rear side than on the front side. Further, an adjustment member 565 for narrowing, in the depth direction, the width of the path of the cooling air stream flowing through the area adjacent to the first column (on the side where an adjacent column is not present), is provided in this adjacent area.

Further, in this second variation, the HDD group installation drawer 19 may have a constitution for adjusting the inclination of each column. For example, the HDD group mounting substrate 21 may be divided into a plurality of long paper-strip-like sub-substrates (sub-substrates that can comprise a column) oriented in the depth direction, and the inclination of each column may be adjusted by changing the inclination with respect to the depth direction of the sub-substrates.

Fifth Embodiment Example

In the fifth embodiment, at least one of the constitution within the controller units 37A and 37B, the constitution within the SW enclosure 3, the constitution within the expansion enclosure 1B and the constitution of the connection between the controller units 37A and 37B and each HDD 23 is different from that of the first embodiment example.

Figure 16:
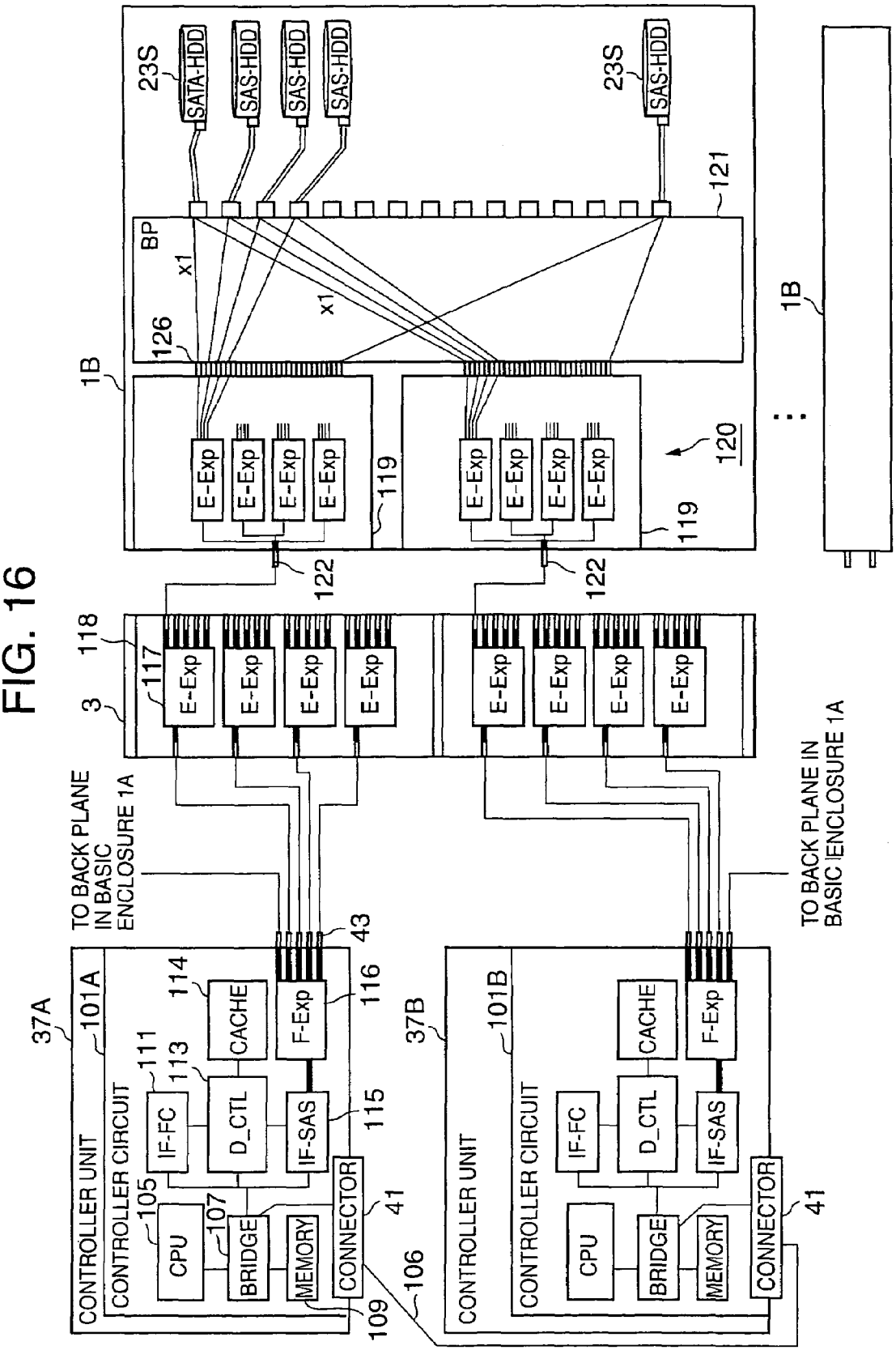
FIG. 16 shows one variation on the constitution within the expansion enclosure 1B.

FIG. 16 shows one variation on the constitution within the expansion enclosure 1B.

According to this variation, the SAS-HDD 23S and SATA-HDD 23A are not mixed within the expansion enclosure 1B. Instead, only SAS-HDDs 23S are present. That is, only SAS-HDDs 23S are connected to the BP 121. The SAS-HDDs 23S have two ports as mentioned earlier and therefore can be connected directly to the BP 121 without the interposition of the PS 123.

So too with this variation, the two controller circuits 101A and 101B are able to manage all of the HDDs 23 provided in the storage subsystem 1 individually.

Figure 17:
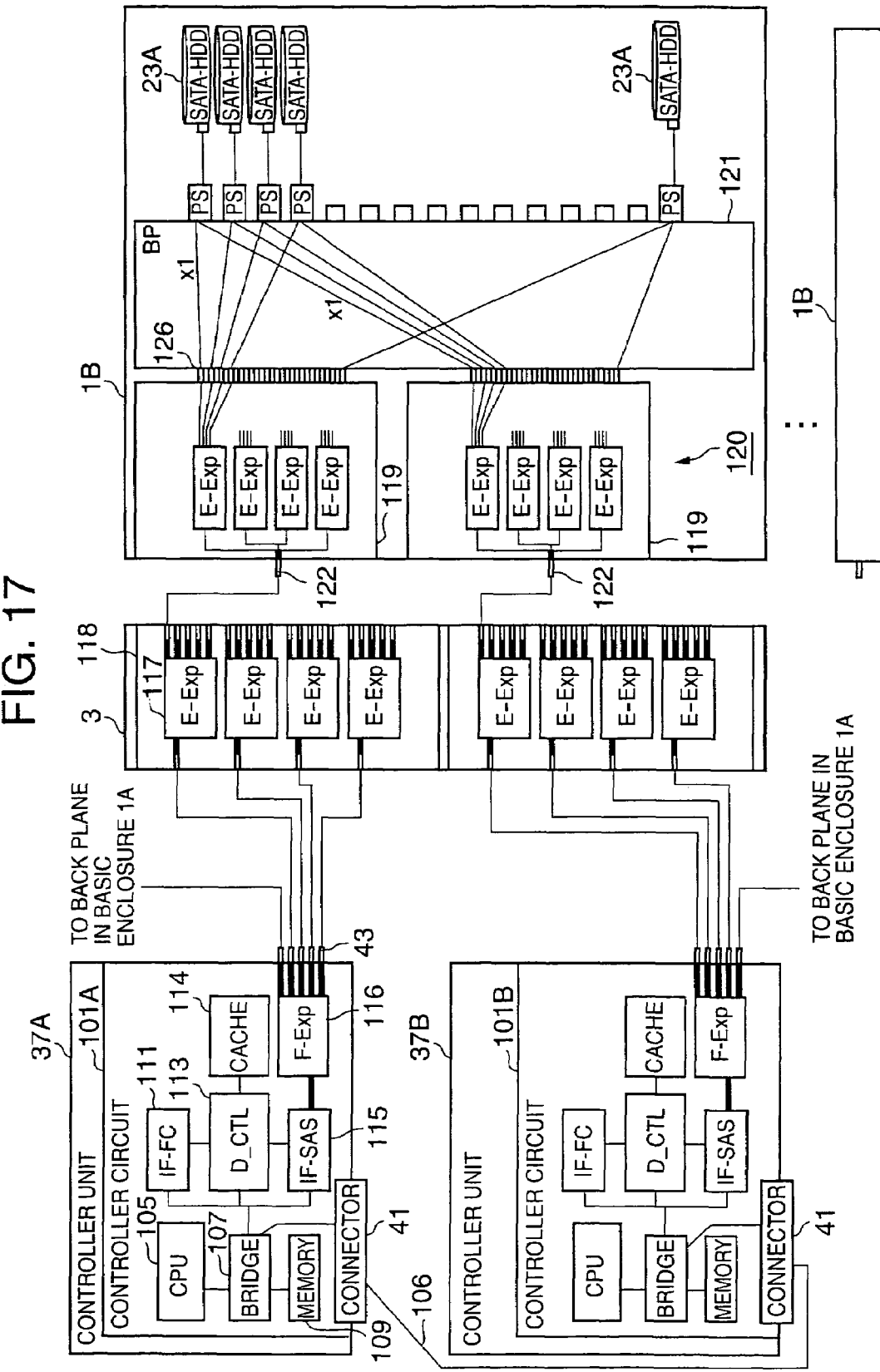
FIG. 17 shows another variation on the constitution in the expansion enclosure 1B.

FIG. 17 shows another variation on the constitution within the expansion enclosure 1B.

According to this variation, the SAS-HDD 23S and SATA-HDD 23A are not mixed within the expansion enclosure 1B. Instead, only SATA-HDDs 23A are present. That is, only SATA-HDDs 23A are connected to the BP 121. The SATA-HDDs 23A are equipped with only one port as mentioned earlier and are therefore connected to the BP 121 via the PS 123.

So too with this variation, the two controller circuits 101A and 101B are able to manage all of the HDDs 23 provided in the storage subsystem 1 individually.

Figure 18:
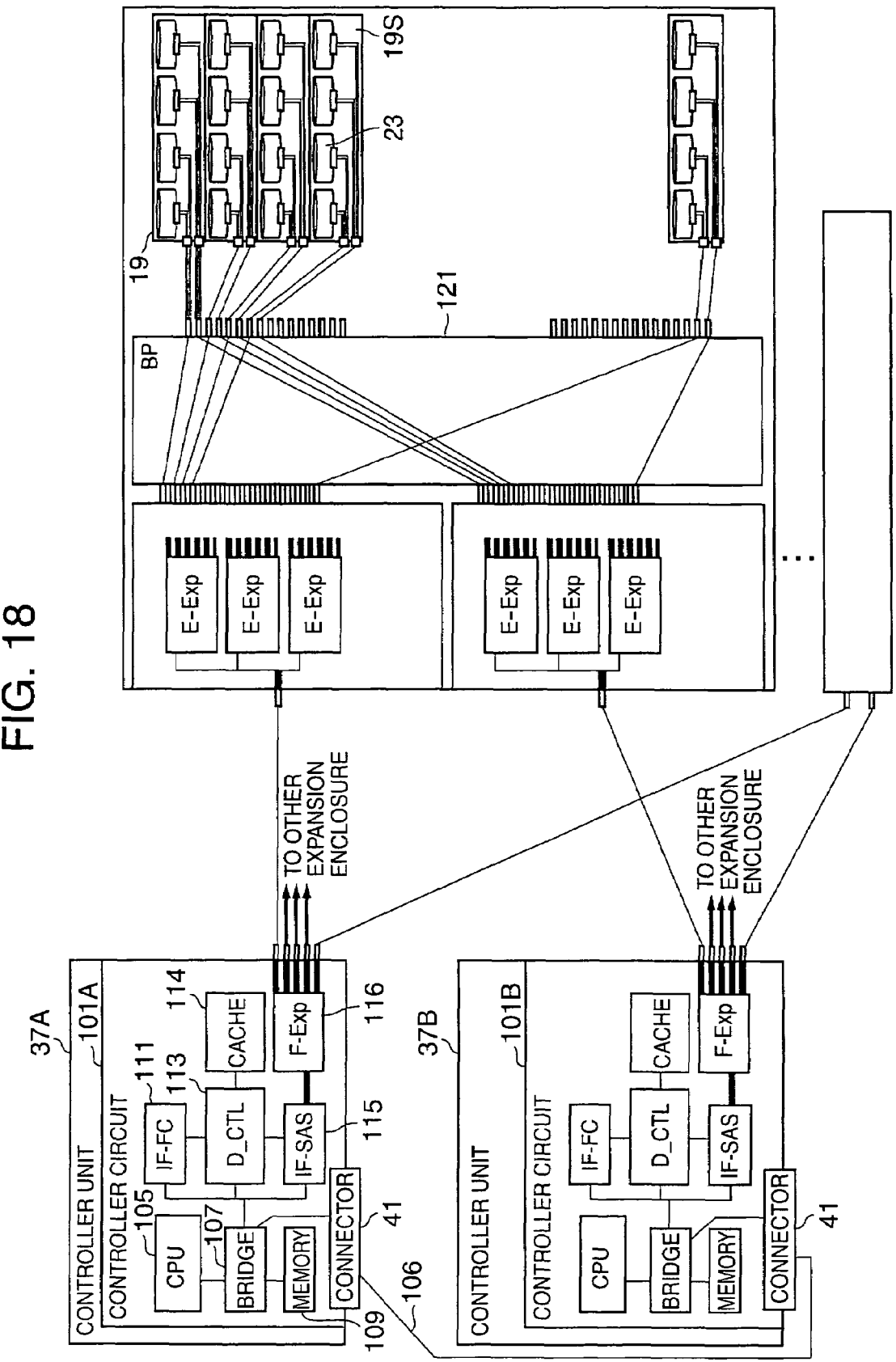
FIG. 18 shows yet another variation on the constitution within the expansion enclosure 1B and one variation on the constitution of the connection between the controller units 37A, 37B and each HDD 23.

FIG. 18 shows yet another variation on the constitution within the expansion enclosure 1B and one variation on the constitution of the connection between the controller units 37A, 37B and each HDD 23. FIG. 19 shows the constitution of the HDD group installation drawer in the expansion enclosure 1B in detail.

According to FIGS. 18 and 19, the HDD group installation drawer 19 in the expansion enclosure 1B comprises a plurality of subdrawers 19S. That is, the plurality of HDD 23 in the expansion enclosure 1B is logically divided into n columns (n is an integer of one or more).

The arrangement of the HDD 23 may be the same for the whole plurality of subdrawers 19S or may be different. For example, as indicated by the reference number 19SA in FIG. 19, all of the two or more HDDs 23 mounted in at least one subdrawer 19S of the plurality of subdrawers 19S may be a SAS-HDD 23S. Further, as indicated by the reference number 19SB, all of the two or more HDDs 23 mounted in at least one of the plurality of subdrawers 19S may be a SATA-HDD 23A. Further, two or more of the HDD 23 that are mounted in at least one subdrawer 19S of the plurality of subdrawers 19S may be a combination of SAS-HDDs 23S and SATA-HDDs 23A, for example. In this case, the SATA-HDD 23A and SAS-HDD 23S may be alternated moving in the direction from the front side of the expansion enclosure 1B toward the rear side in at least one subdrawer 19SC of the plurality of subdrawers 19S. Further, at least one subdrawer 19SD of the plurality of subdrawers 19S may have a concentration of SATA-HDDs 23A on the front side thereof and a concentration of SAS-HDDs 23S on the rear side thereof.

According to FIG. 18, the controller circuits 101A and 101B are connected to the expansion enclosure 1B without the interposition of the SW enclosure 3. Further, the first controller circuit 101A is connected to the HDDs 23 that exist on the rear side of each subdrawer 19S but is not connected to the HDDs 23 that exist on the front side. The second controller circuit 101B is connected to the HDDs 23 that exist on the front side of each subdrawer 19S but is not connected to the rear-side HDDs 23 to which the first controller circuit 101A is connected.

Several embodiments of the present invention were described hereinabove but the present invention is not limited to or by the above embodiments. A person skilled in the art is able to add to, take from or modify the constitution within the scope of the present invention. For example, because the illustrated flowchart is merely a flowchart to show clearly the processing flow, a person skilled in the art is able to switch, cancel or modify the steps easily so that an understanding and implementation of the invention are not impaired.

For example, among the connecting lines between the back plane 17 and HDD 23 or the connecting lines between the back plane 17 and each of the units 19, 37A and 37B, the power supply line may be constituted by wiring on the printed substrate and the signal line (the data transfer line, for example) may be constituted by a cable.

Moreover, a combination of columns that are constituted by SATA-HDD 23A and columns that are constituted by SAS-HDD 23S in the enclosures 1A and 1B are acceptable. In this case, the width of at least one intercolumn path 91 of the two intercolumn paths 91 adjacent to the column constituted by the SAS-HDDs 23S is greater than the width of at least one intercolumn path 91 among the two intercolumn paths 91 adjacent to the column constituted by the SATA-HDD 23A. This is because the SAS-HDD 23S reaches a high temperature more readily than the SATA-HDD 23A and therefore the volume of the air stream flowing adjacent to the column of SAS-HDDs 23S is greater than the volume of the air stream flowing adjacent to the column of SATA-HDDs 23A. FIG. 20A shows a specific example. In FIG. 20, columns constituted by SATA-HDDs 23A and columns constituted by SAS-HDDs 23S are arranged alternately.

Further, for example, control of the power supply of the plurality of HDDs 23 (to turn the power supply ON and OFF, for example) in each of the enclosures 1A and 1B may be performed for each HDD 23 or may be performed in n-column units (may be executed in units of the subdrawers 19S, for example) or in x-row units (x is an integer of one or more), for example.

Moreover, for example, the types of HDDs 23 are not limited to at least one type of SAS and SATA. There may instead be different types (Fiber Channel, for example).

What is claimed is:

1. A storage subsystem that is connected to an external device, comprising:
   a plurality of enclosures each of which has a drawer slideable in a depth direction of a horizontal plane therein and thereout, each drawer including a plurality of slots for inserting upright therein a storage device such that a plurality of storage devices are arranged in a matrix with M columns of storage devices in a width direction of the horizontal plane and N rows of storage devices in the depth direction; and
   a control device that is connected to the external device, controls communications between the plurality of storage devices and the external device, and sends information to the external device to display a corresponding relationship between logical volumes and physical positions of the storage devices in each enclosure, each logical volume being a logical storage device formed on one or more of the storage devices,
   wherein each of the storage devices is inserted or removed after the respective drawer is pulled out from the respective enclosure, and
   when one of the storage devices is damaged, the control device sends to the external device information of a corresponding relationship between a physical position of the damaged storage device in a respective enclosure and a logical volume to display the corresponding relationship wherein the plurality of storage devices includes a low-heat storage device that emits heat by consuming first electrical power and a high-heat storage device that emits heat that is of a higher temperature than the heat of the low-heat storage device by consuming second electrical power, the storage subsystem further comprises: a cooling portion that causes a gas for cooling the storage devices arranged on a storage device arrangement portion to flow to the storage device arrangement portion, and the storage device arrangement portion is constituted such that the low-heat storage device is disposed upstream in the direction in which the gas flows and the high-heat storage device is disposed downstream in the direction in which the gas flows.

2. The storage subsystem according to claim 1, further comprising:
slide mechanism that slides the drawer inside and outside the respective enclosure.

3. The storage subsystem according to claim 2, wherein the drawer comprises:
a first sub-arrangement portion for arranging two or more first storage devices among the plurality of storage devices; and
a second sub-arrangement portion for arranging two or more second storage devices among the plurality of storage devices, and
the slide mechanism slides the first sub-arrangement portion and the second sub-arrangement portion separately.

4. The storage subsystem according to claim 1, further comprising:
a cooling portion that causes a gas for cooling the storage devices to flow to the drawer,
wherein gas flows are formed in the depth direction as separated by the M storage device columns at equal intervals.

5. The storage subsystem according to claim 1, further comprising:
a cooling portion that causes a gas for cooling the storage devices to flow to the drawer; and
a dummy storage device disposed on a slot of the drawer so that the flow of gas is not disturbed when a number of storage devices is smaller than the maximum number of storage devices that can be arranged in the drawer.

6. The storage subsystem according to claim 1, further comprising:
a cooling portion that causes a gas for cooling the storage devices to flow to the drawer,
wherein gas flows are formed to flow through a plurality of flow paths among the M storage device columns, and the width of at least one of the flow paths is narrower downstream than upstream in the depth direction.

7. The storage subsystem according to claim 1, wherein the drawer includes M sub-drawers each corresponding to one of the M storage device columns, and
one of the sub-drawers is selected by a user as detected to be slide out of a respective enclosure so as to remove a damaged storage device that belongs to the selected storage device column.

8. The storage subsystem according to claim 1,
wherein a GUI screen displays a graphic representing an arranged storage device in each of the plurality of display positions inside the drawer, and displays at least one of a type and a state of the storage device on the GUI screen.

9. The storage subsystem according to claim 8, wherein a type of the storage device includes SATA, SAS, or dummy.

10. The storage subsystem according to claim 8, wherein a state of the storage device includes active, standby, failed, or under repair.

11. The storage subsystem according to claim 1, wherein the plurality of storage devices includes a low-heat storage device that emits heat by consuming first electrical power and a high-heat storage device that emits heat that is of a higher temperature than the heat of the low-heat storage device by consuming second electrical power,
the storage subsystem further comprises:
a cooling portion that causes a gas for cooling the storage devices arranged on the storage device arrangement portion to flow to the storage device arrangement portion, and
the storage device arrangement portion is constituted such that the low-heat storage device is disposed upstream in the direction in which the gas flows and the high-heat storage device is disposed downstream in the direction in which the gas flows.

12. A storage subsystem that is connected to an external device, comprising:
a storage device arrangement portion on which a plurality of storage devices is arranged; and
a control device that controls communications between the plurality of storage devices arranged on the storage device arrangement portion and the external device,
wherein the storage device arrangement portion is constituted such that the plurality of storage devices is arranged upright in the directions of two dimensions,
the plurality of storage devices includes a low-heat storage device that emits heat by consuming first electrical power and a high-heat storage device that emits heat that is of a higher temperature than the heat of the low-heat storage device by consuming second electrical power,
the storage subsystem further comprises:
a cooling portion that causes a gas for cooling the storage devices arranged on the storage device arrangement portion to flow to the storage device arrangement portion, and
the storage device arrangement portion is constituted such that the low-heat storage device is disposed upstream in the direction in which the gas flows and the high-heat storage device is disposed downstream in the direction in which the gas flows.

13. A storage subsystem that is connected to an external device, comprising:
a plurality of enclosures each of which has a drawer slideable in a depth direction of a horizontal plane therein and thereout, each drawer including a plurality of slots for inserting upright therein a storage device such that a plurality of storage devices are arranged in a matrix with M columns of storage devices in a width direction of the horizontal plane and N rows of storage devices in the depth direction;
a slide mechanism that slides the drawer inside and outside the respective enclosure;
a cooling portion that causes a gas for cooling the storage devices to flow to the drawer; and
a control device that is connected to the external device, controls communications between the plurality of storage devices and the external device, and sends information to the external device to display a corresponding relationship between logical volumes and physical positions of the storage devices in each enclosure, each logical volume being a logical storage device formed on one or more of the storage devices, wherein each of the storage devices is inserted or removed after the respective drawer is pulled out from the respective enclosure, when one of the storage devices is damaged, the control device sends to the external device information of a corresponding relationship between a physical position of the damaged storage device in a respective enclosure and a logical volume to display the corresponding relationship, gas flows are formed in the depth direction as separated by the M storage device columns at equal intervals, and the drawer includes M sub-drawers each corresponding to one of the M storage device columns, and one of the sub-drawers is selected by a user as detected to be slide out of a respective enclosure so as to remove a damaged storage device that belongs to the selected storage device column wherein the plurality of storage devices includes a low-heat storage device that emits heat by consuming first electrical power and a high-heat storage device that emits heat that is of a higher temperature than the heat of the low-heat storage device by consuming second electrical power, the storage subsystem further comprises: a cooling portion that causes a gas for cooling the storage devices arranged on a storage device arrangement portion to flow to the storage device arrangement portion, and the storage device arrangement portion is constituted such that the low-heat storage device is disposed upstream in the direction in which the gas flows and the high-heat storage device is disposed downstream in the direction in which the gas flows.

* * * * *